(12) United States Patent
Hagaribommanahalli et al.

(10) Patent No.: US 12,077,177 B2
(45) Date of Patent: Sep. 3, 2024

(54) AUTONOMOUS VEHICLE CONTROL AND MAP ACCURACY DETERMINATION BASED ON PREDICTED AND ACTUAL TRAJECTORIES OF SURROUNDING OBJECTS AND VEHICLES

(71) Applicant: Nissan North America, Inc., Franklin, TN (US)

(72) Inventors: Sachin Hagaribommanahalli, Sunnyvale, CA (US); Christopher Ostafew, Mountain View, CA (US); David Ilstrup, Santa Cruz, CA (US)

(73) Assignee: Nissan North America, Inc., Franklin, TN (US)

( * ) Notice: Subject to any disclaimer, the term of this patent is extended or adjusted under 35 U.S.C. 154(b) by 149 days.

(21) Appl. No.: 17/330,839

(22) Filed: May 26, 2021

(65) Prior Publication Data

US 2022/0379910 A1 Dec. 1, 2022

(51) Int. Cl.
*B60W 40/09* (2012.01)
*B60W 60/00* (2020.01)
*G06K 9/00* (2022.01)
*G06V 20/59* (2022.01)

(52) U.S. Cl.
CPC .......... *B60W 60/001* (2020.02); *B60W 40/09* (2013.01); *G06V 20/597* (2022.01); *B60W 2540/215* (2020.02); *B60W 2540/22* (2013.01)

(58) Field of Classification Search
CPC ......... B60W 60/001; B60W 2540/215; B60W 40/09; B60W 2540/22
See application file for complete search history.

(56) References Cited

U.S. PATENT DOCUMENTS

| | | | |
|---|---|---|---|
| 2015/0253141 A1* | 9/2015 | Kesting | G01C 21/30 701/409 |
| 2018/0354508 A1* | 12/2018 | Sim | B60W 30/18163 |
| 2019/0369616 A1* | 12/2019 | Ostafew | B60W 60/00274 |
| 2020/0089246 A1* | 3/2020 | McGill, Jr. | G05D 1/0088 |
| 2020/0150665 A1* | 5/2020 | Refaat | B60W 60/0015 |
| 2020/0158517 A1* | 5/2020 | Tadi | G06T 7/579 |
| 2020/0339151 A1* | 10/2020 | Batts | B60W 60/001 |
| 2021/0035449 A1* | 2/2021 | Merfels | H04L 67/5651 |
| 2021/0056712 A1* | 2/2021 | Daudelin | G06V 20/56 |

(Continued)

*Primary Examiner* — Jess Whittington
*Assistant Examiner* — Rami Nabih Bedewi
(74) *Attorney, Agent, or Firm* — Young Basile Hanlon & MacFarlane, P.C.

(57) ABSTRACT

Detecting prediction errors includes detecting a road user; determining respective predicted data for the road user; storing, in a data structure, the respective predicted data; storing, in the data structure, actual data of the road user; obtaining an average prediction displacement error using at least one of the actual data and at least two corresponding respective predicted data; and determining a prediction accuracy based on the average prediction displacement error. Detecting map errors includes detecting a road user; storing, in a data structure, actual data of the road user; storing, in the data structure, map data corresponding to the actual data; obtaining an average map displacement error based on a comparison of at least some of the actual data and corresponding at least some map data; and determining a map accuracy based on the average map displacement error.

20 Claims, 13 Drawing Sheets

(56) References Cited

U.S. PATENT DOCUMENTS

| | | | |
|---|---|---|---|
| 2021/0163038 A1* | 6/2021 | Huang | G06V 20/58 |
| 2021/0271901 A1* | 9/2021 | Garimella | G08G 1/0112 |
| 2022/0126864 A1* | 4/2022 | Moustafa | B60W 30/182 |
| 2022/0163346 A1* | 5/2022 | Han | G06V 20/588 |
| 2022/0188667 A1* | 6/2022 | Burisch | G08G 1/166 |
| 2022/0234618 A1* | 7/2022 | Kabzan | B60W 30/09 |
| 2022/0379920 A1* | 12/2022 | Yang | B60W 30/09 |
| 2022/0412770 A1* | 12/2022 | Li | G01C 21/3807 |

* cited by examiner

AUTONOMOUS VEHICLE CONTROL AND MAP ACCURACY DETERMINATION BASED ON PREDICTED AND ACTUAL TRAJECTORIES OF SURROUNDING OBJECTS AND VEHICLES

TECHNICAL FIELD

This application relates to autonomous vehicles, including methods, apparatuses, systems, and non-transitory computer-readable media for real-time map and prediction diagnostics.

BACKGROUND

For safe and reliable operation, at least some sub-systems in a vehicle may include inherent self-monitoring capabilities, issue detection capabilities, and, if possible, remediation capabilities.

Autonomous vehicles (or more broadly, autonomous driving) offer human drivers the convenience of efficient conveyance from one location to another without having to direct their attention to the state of the road. An autonomous vehicle may plan a trajectory to traverse a portion of a vehicle transportation network based on scene understanding of the portion of a vehicle transportation network.

However, sub-optimal or inaccurate scene understanding may cause the programming of the autonomous vehicle to plan sub-optimal trajectories for the AV. As such, detecting, diagnosing, and possibly remedying errors related to scene misunderstanding can be advantageous in autonomous driving.

SUMMARY

A first aspect is a method for detecting prediction errors. The method includes detecting a road user; determining respective predicted data for the road user; storing, in a data structure, the respective predicted data; storing, in the data structure, actual data of the road user; obtaining an average prediction displacement error using at least one of the actual data and at least two corresponding respective predicted data; and determining a prediction accuracy based on the average prediction displacement error. The average prediction displacement error can indicate a displacement that an actual trajectory of the road user exhibits compared to a predicted trajectory of the road user through time, and the at least two corresponding respective predicted data can be predictions of the at least one of the actual data.

A second aspect is a method for detecting map errors. The method includes detecting a road user; storing, in a data structure, actual data of the road user; storing, in the data structure, map data corresponding to the actual data; obtaining an average map displacement error based on a comparison of at least some of the actual data and corresponding at least some map data; and determining a map accuracy based on the average map displacement error. The map data can be obtained from a high-definition map. The average map displacement error can indicate differences between a mapped driveline of a lane and how the road user actually traverses the lane.

A third aspect is an apparatus that includes a processor. The processor is configured to detect a road user; store, in a data structure, actual data of the road user; store, in the data structure, map data corresponding to the actual data; obtain an average map displacement error based on a comparison of at least some of the actual data and corresponding at least some map data; and determine a map accuracy based on the average map displacement error. The map data can be obtained from a high-definition map. The average map displacement error can indicate differences between a mapped driveline of a lane and how the road user actually traverses the lane.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
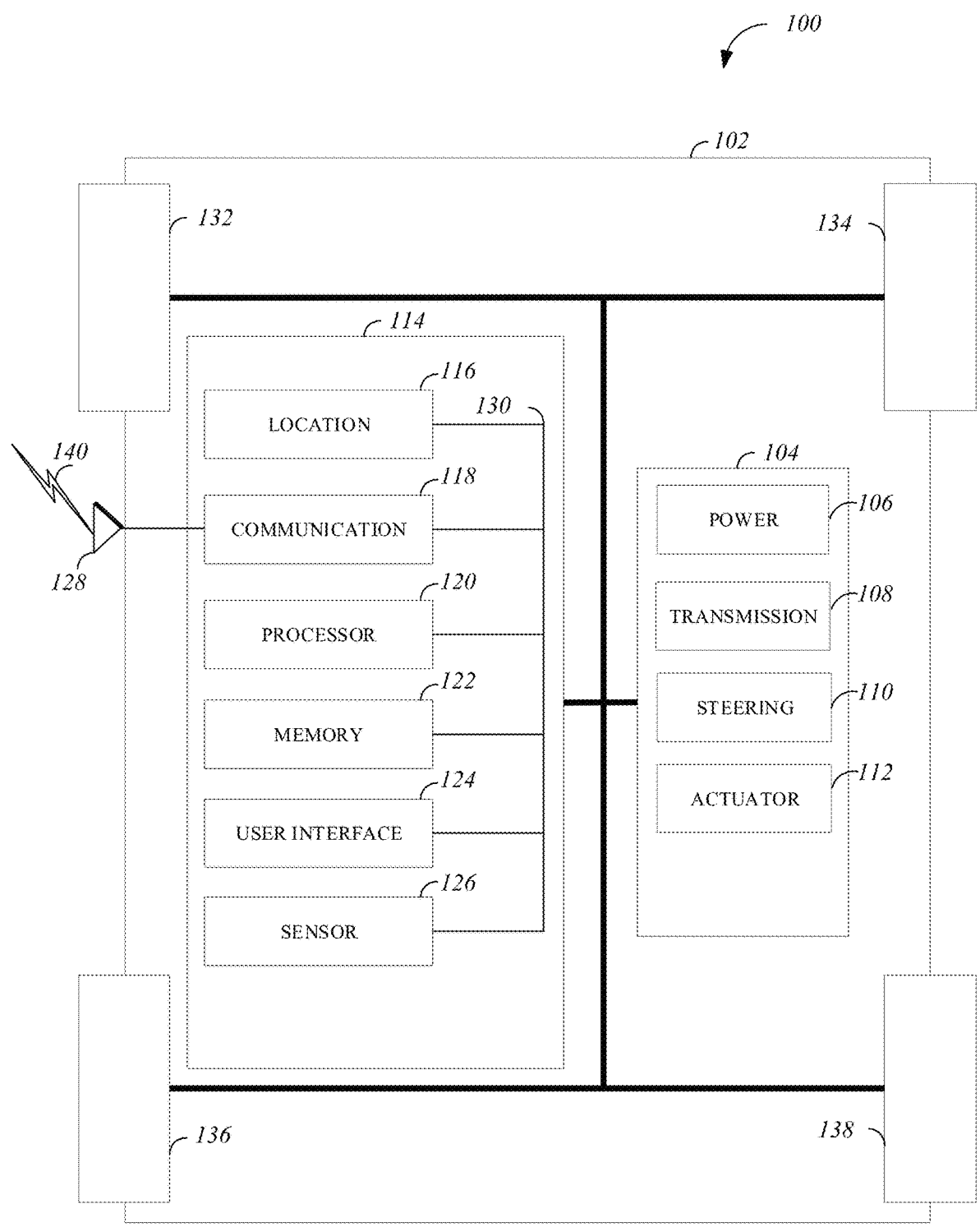
FIG. 1 is a diagram of an example of a portion of a vehicle in which the aspects, features, and elements disclosed herein may be implemented.

A vehicle (which may also be referred to herein as a host vehicle), such as an autonomous vehicle (AV) or a semi-autonomous vehicle (collectively, autonomous vehicle), may autonomously traverse a portion of a vehicle transportation network. Autonomously traversing the vehicle transportation network, as used herein, can mean that the host vehicle is configured to be in an autonomous mode in which the vehicle navigates through the vehicle transportation network with little or no input from a human driver.

The host vehicle may include one or more sensors. Traversing the vehicle transportation network may include the sensors generating or capturing sensor data, such as data corresponding to an operational environment of the vehicle, or a portion thereof. For example, the sensor data may include data corresponding to one or more external objects (or simply, objects) including other (i.e. other than the host vehicle itself) road users (such as other vehicles, bicycles, motorcycles, trucks, etc.) that may also be traversing the vehicle transportation network.

As mentioned above, a trajectory can be planned (such as by a trajectory planner of the host vehicle) based on scene understanding. A scene can include the external objects (e.g., the road users) detected using sensors of the host vehicle, including static and dynamic objects. Scene understanding can include predicted trajectories of at least some of the other road users. A scene can also include data available in a high definition (HD) map. The HD map can include driveline data. A driveline can be a line of a lane such that a longitudinal axis of a road user traversing the lane can be expected to align with the driveline. As such, scene understanding can include drivelines of the predicted trajectories of the at least some of the other road users.

The trajectory planner can receive anticipated (i.e., predicted) trajectories of other road users of the vehicle transportation network. The trajectories can be received from another module (e.g., a world model module) of the host vehicle. For detected dynamic objects (e.g., a road user, such as a vehicle, a pedestrian, a bicycle, and the like), the world model module can maintain (e.g., predict and update) one or more respective hypothesis regarding the possible intentions of the road users. Examples of intentions (e.g., hypotheses) include stop, turn right, turn left, go straight, pass, park, and the like. A likelihood may be associated with each hypothesis. The likelihood can be updated based on observations (e.g., actual data) associated with the real-world objects received based on sensor data.

The road users can be detected based on received sensor data (also referred to herein as measurements or sensor observations). The world model module can maintain (i.e., associate and updates over time) a state for each hypothesis (e.g., intention) associated with a road user. For example, the state can include poses of the road user based on the intention of a hypothesis.

However, poor or inaccurate scene understanding (collectively, inaccurate scene understanding) may cause the trajectory planner of the vehicle to plan sub-optimal or unsafe trajectories for the host vehicle. Inaccurate scene understanding can mean, can include, or can result in the host vehicle determining predictions for at least some other road users that do not match the actual performances of the at least some of the other road users.

Inaccurate scene understanding may occur in several situations. For example, inaccurate scene understanding may occur when the data in the HD map is inaccurate. For example, inaccurate scene understanding may occur if the data in the HD map is accurate but road users may drive in ways that are not according to the data in the HD map. To illustrate, and without loss of generality, a left-turn driveline at an intersection may be accurately mapped; however, a majority of road users may drive past the mapped driveline before turning left at the interaction. It is noted that there can be a wide variance on how drivers make the turn (or confront any other driving situation or driveline). In another example, inaccurate scene understanding can occur or can manifest itself when road users follow trajectories that are different from the trajectories that the programming of the host vehicle predicted.

Real-time map and prediction diagnostics can be used to evaluate the understanding of a scene by a host vehicle. Evaluating the scene understanding can include estimating the accuracy of the HD map in real-time, estimating the accuracy of the predictions of trajectories of road user directories, or a combination thereof. The accuracy of the HD map or the accuracy of the predictions can be used as metrics which can be used to detect scene understanding issues, to diagnose the issues, and to mitigate the issues.

Real-time map and prediction diagnostics can include detecting and storing recent history of a road user (e.g., of one or more road users) and predictions of states the other road user with respect to mapped drivelines (i.e., drivelines obtained from an HD map). The stored and the predicted data points can include, but are not limited to, longitudinal position, latitudinal position, heading, and speed for each of mapped, actual, and predicted poses of the road user. Predictions of a trajectory of the road user can be generated using data of an HD map (such as lanes, lane curvatures, and speed limits) and classification of the road user (such as whether the user is bicycle, a truck, a car, etc.), other data, or a combination thereof.

Real-time map and prediction diagnostics can include estimating, such as in real-time, the accuracy of an HD map. Implementations according to this disclosure can obtain (e.g., calculate, estimate, determine, select, etc.) an Average Map Displacement Error (AMDE) that can include, or be based on, a comparison of tracked (e.g., observed, sensed, actual, etc.) states of the road user with respect to nearest mapped poses (e.g., HD map poses). The AMDE can describe or indicate differences between a mapped driveline of a lane and how a road user actually traverses the lane. In some implementations, an uncertainty value can be associated with the AMDE.

Real-time map and prediction diagnostics can include obtaining, such as in-real time, an Average Prediction Displacement Error (APDE), which can include estimating the accuracy of the predictions of the trajectories of the road user. The APDE of a prediction can be defined as the displacement that the actual trajectory of the road user exhibits compared to a prediction of the trajectory of the road user through time. Said another way, the APDE of a prediction can be defined as the displacement that a trajectory of the road user has compared to the prediction of the trajectory of the road user through time. In some implementations, an uncertainty value can be associated with the APDE.

The evaluation of the scene understanding, determined using or more of the AMDE and the APDE, can be used to determine whether predicted trajectories of other road users can be relied upon (such that the host vehicle can continue operating autonomously), whether precaution is necessary (for example, a human driver may be prompted to stay alert or to keep his/her hands on the steering wheel), or whether operation and control of the host vehicle is to be handed off to a driver or a teleoperator. The AMDE and/or APDE can be used in real-time to adjust the conservativeness of decision making and trajectory planning. The APDE can be used to provide a baseline for introspective diagnostics. For example, consistently high APDE (such as over a predefined period of time) may indicate issues in one or more of the perception, detection, tracking, or prediction systems of the host vehicle.

In real-time, a prediction analysis module of the host vehicle can use the APDE to assess the quality of a given prediction associated with a road user and detect exceptions (e.g., deviations from the prediction). For example, under normal road conditions (such as when the path of the other road user is not obstructed), small discrepancies between the poses of the other road user poses on the one hand and map or prediction poses on the other can be expected. In an example, less than 0.5 meters of lateral error (for the AMDE or the APDE) can be considered a small discrepancy. However, other values are possible. In an example, a particular number can be derived using statistical methods after obtaining a sufficiently large amount of data. That is to say that, essentially, road users follow the mapped drivelines and follow the predicted trajectories. In the case that the path of the other road user is obstructed (such as by a bicycle, a pedestrian, or static objects), large discrepancies between road user poses and map poses can be expected on the one hand; however small discrepancies between road user poses and prediction poses can be expected by the prediction analysis module. That is to say that, essentially, road users can be expected to leave mapped drivelines to go around other road users, and the prediction algorithms of the host vehicle should anticipate such departures. In the case that the prediction analysis module determines that the prediction errors are increasing, then the prediction analysis module may determine that an issue exists with the HD map or with the prediction algorithm.

Implementations according to this disclosure can detect map errors or prediction errors. Responsive to detecting an error, a prediction analysis module of the host vehicle can include inform the driver assist or autonomous drive system of the issue, can (or can cause other modules of the host vehicle to) diagnose the problem, and can (or can cause other modules of the host vehicle to) potentially remedy the issue. In some implementations, the level of errors (i.e., the AMDE or APDE) can be used as metrics indicative of scene understanding. Responsive to the host vehicle (e.g., a prediction analysis module therein) encountering a scene with poor understanding, the host vehicle can be controlled to perform a safety maneuver. The safety maneuver can include one of more of controlling the host to automatically slow down, handing off control to a driver, handing off control to a teleoperator, stopping, taking other mitigation actions as described herein, other safety maneuver, or a combination thereof.

Although described herein with reference to an autonomous host vehicle, the techniques and apparatuses described herein may be implemented in any vehicle capable of autonomous or semi-autonomous operation. Although described with reference to a vehicle transportation network, the method and apparatus described herein may include the autonomous vehicle operating in any area navigable by the host vehicle.

To describe some implementations of the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals, power, such as electrical power or torque, or both information and power, may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
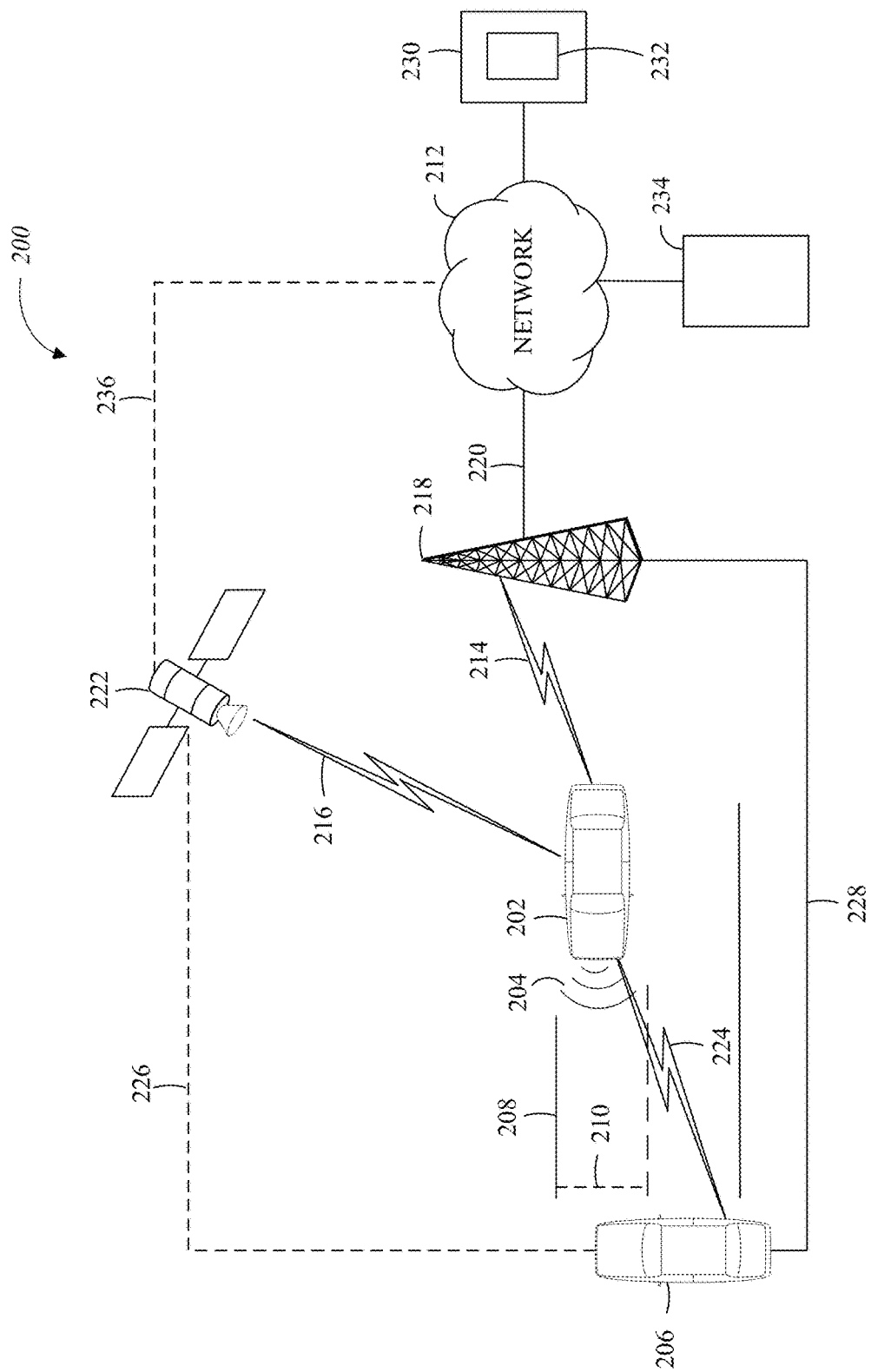
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
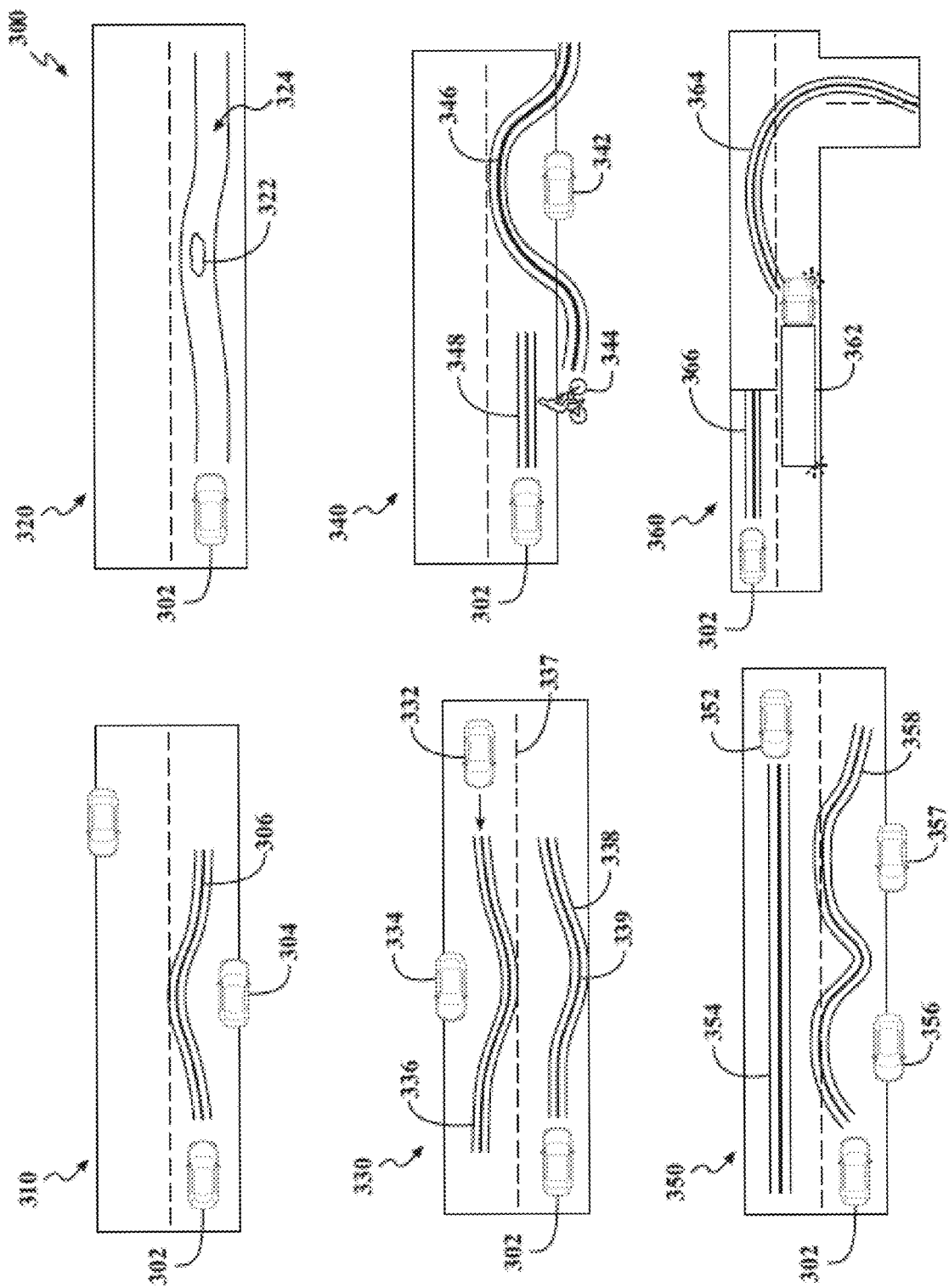
FIG. 3 is a diagram of situations of predictable responses.

FIG. 3 is a diagram of situations 300 of predictable responses. The situations 300 include situations 310-360 in which responses of an autonomous vehicle (AV) 302 can be predicted and a trajectory planned.

The situations 300 represent examples of predictable situations and responses of road users. The situations take place (e.g., happen, occur, etc.) at a slow time scale. That is, even if the AV 302 might be going at a high speed (e.g., 60 miles per hour (MPH)), the situations 310-360 are considered to be slow scenarios because, due to the computing power (e.g., the computing power of a processor, such as the processor 120 of FIG. 1, and/or a controller, such as the controller 114 of FIG. 1) of the AV 302, predicting responses of external objects and determining a trajectory for the autonomous vehicle can be accomplished within a subsecond of elapsed time.

The AV 302 can include a world modeling module, which can track at least some detected external objects. The world modeling module can predict one or more potential hypotheses (i.e., trajectories, paths, or the like) for each tracked object of at least some of the tracked objects. The AV 302 can include a trajectory planning system (or, simply, a trajectory planner) that can be executed by a processor to generate (considering an initial state, desired actions, and at least some tracked objects with predicted trajectories) a collision-avoiding, law-abiding, comfortable response (e.g., trajectory, path, etc.).

In the situation 310, the AV 302 detects (i.e., by the tracking component) a parked car 304 (i.e., a static object) at the side of the road. The AV 302 (i.e., the trajectory planner of the AV 302) can plan a path (i.e., a trajectory), as further described below, that navigates the AV 302 around the parked car 304, as shown by a trajectory 306.

The situation 320 is another situation where the AV 302 detects another static object. The detected static object is a pothole 322. The AV 302 can plan a trajectory 324 such that the AV 302 drives over the pothole 322 in a way that none of the tires of the AV 302 drive into the pothole 322.

In the situation 330, the AV 302 detects an oncoming vehicle 332 and a parked vehicle 334 that is on the same side of the road as the oncoming vehicle 332. The oncoming vehicle 332 is moving. As such, the oncoming vehicle 332 is a dynamic object. The oncoming vehicle 332 is moving in the same (or at least substantially the same) longitudinal direction as the AV 302. As such, the oncoming vehicle 332 can be classified as a longitudinal constraint, as further described below. The oncoming vehicle 332 is moving in the direction opposite that of the AV 302. As such, the oncoming vehicle 332 can be classified as an oncoming longitudinal constraint. The parked vehicle 334 is a static object.

The AV 302 can predict (i.e., by the prediction component), with a certain degree of certainty that exceeds a threshold, that the oncoming vehicle 332 is likely to follow a trajectory 336 in order to avoid (e.g., get around) the parked vehicle 334. The trajectory 336 overlaps a centerline 337 of the road. In order to keep a safe distance from the oncoming vehicle 332, the trajectory planner of the AV 302 can plan a trajectory 338 that includes a curvature at location 339. That is, the planned trajectory of the AV 302 moves the AV 302 to the right in anticipation of the route of the oncoming vehicle 332.

In the situation 340, the tracking component of the AV 302 can detect a parked vehicle 342 (i.e., a static object) and a bicycle 344 that is moving (i.e., a dynamic object that is a longitudinal constraint). The prediction component may determine, with a certain degree of certainty, that the bicycle 344 will follow a trajectory 346 to get around the parked vehicle 342. As such, the AV 302 determines (i.e., plans, calculates, selects, generates, or otherwise determines) a trajectory 348 such that the AV 302 slows down to allow the bicycle 344 to pass the parked vehicle 342. In another example, the AV 302 can determine more than one possible trajectory. For example, the AV 302 can determine a first trajectory as described above, a second trajectory whereby the AV 302 accelerates to pass the bicycle 344 before the bicycle 344 passes the parked car, and a third trajectory whereby the AV 302 passes around the bicycle 344 as the bicycle 344 is passing the parked vehicle 342. The trajectory planner then selects one of the determined possible trajectories.

In the situation 350, the tracking component of the AV 302 detects an oncoming vehicle 352, a first parked vehicle 356, and a second parked vehicle 357. The prediction component of the AV 302 determines that the oncoming vehicle 352 is following a trajectory 354. The AV 302 selects a trajectory 358 such that the AV 302 passes the first parked vehicle 356, waits between the first parked vehicle 356 and the second parked vehicle 357 until the oncoming vehicle 352 passes, and then proceeds to pass the second parked vehicle 357.

In the situation 360, the prediction component of the AV 302 determines that a large truck 362 is most likely turning right. The trajectory planner determines (e.g., based on a motion model of a large truck) that, since a large truck requires a large turning radius, the large truck 362 is likely to follow a trajectory 364. As the trajectory 364 interferes with the path of the AV 302, the trajectory planner of the AV 302 determines a trajectory 366 for the AV 302, such that the AV 302 is brought to a stop until the large truck 362 is out of the way.

Figure 4:
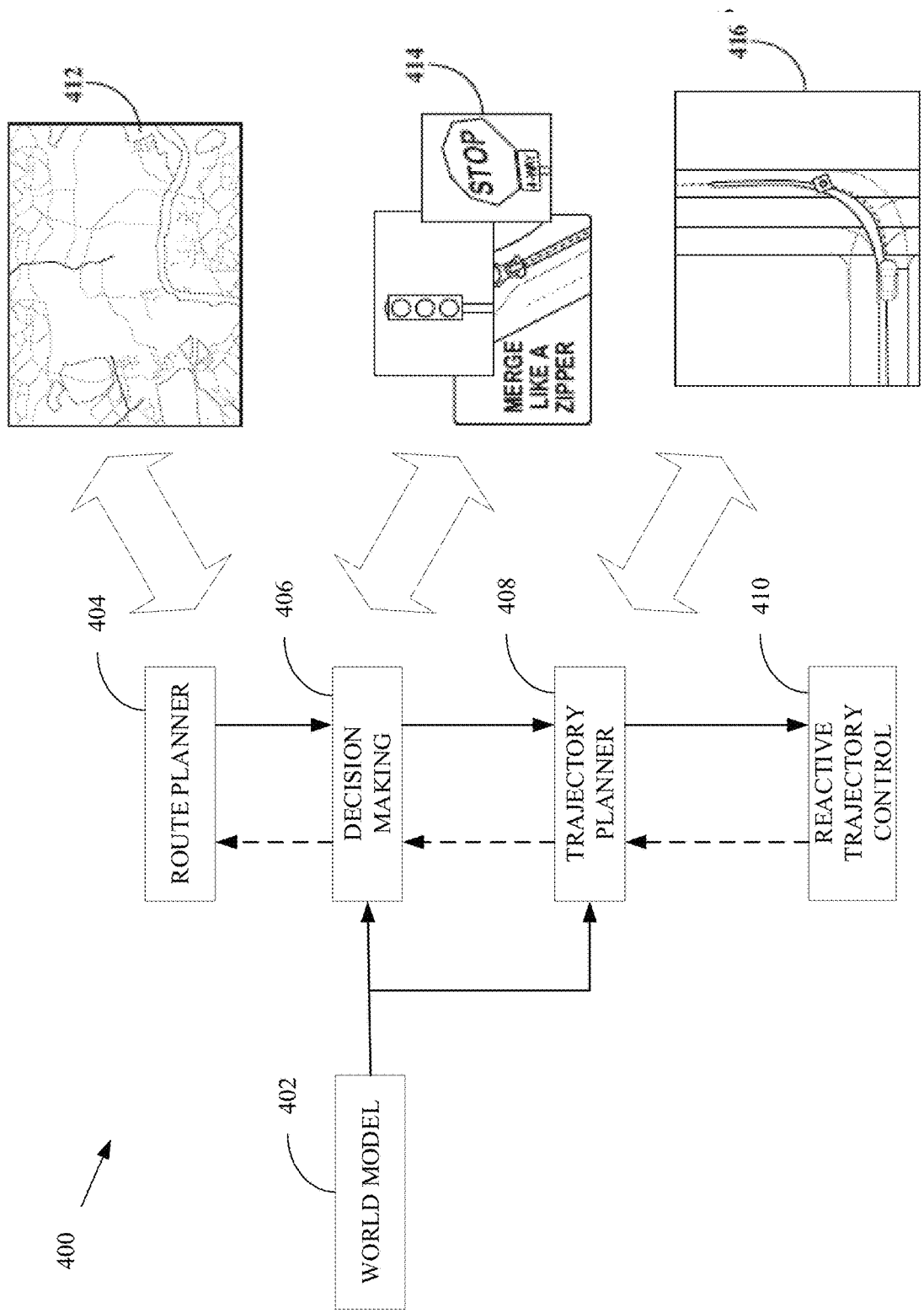
FIG. 4 is an example of components of a system for an autonomous vehicle.

FIG. 4 is an example of components of a system 400 for an autonomous vehicle. The system 400 represents a software pipeline of an autonomous vehicle, such as the vehicle 100 of FIG. 1. The system 400 includes a world model module 402, a route planning module 404, a decision making module 406, a trajectory planner 408, and a reactive trajectory control module 410. Other examples of the system 400 can include more, fewer, or other modules. In some examples, the modules can be combined; in other examples, a module can be divided into one or more other modules.

The world model module 402 receives sensor data, such as from the sensor 126 of FIG. 1, and determines (e.g., converts to, detects, etc.) objects from the sensor data. That is, for example, the world model module 402 determines the road users from the received sensor data. For example, the world model module 402 can convert a point cloud received from a light detection and ranging (LiDAR) sensor (i.e., a sensor of the sensor 126) into an object. Sensor data from several sensors can be fused together to determine (e.g., guess the identity of) the objects. Examples of objects include a bicycle, a pedestrian, a vehicle, etc.

The world model module 402 can receive sensor information that allows the world model module 402 to calculate and maintain additional information for at least some of the detected objects. For example, the world model module 402 can maintain a state for at least some of the determined objects. For example, the state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model module 402 fuses sensor information, tracks objects, maintains lists of hypotheses for at least some of the dynamic objects (e.g., an object A might be going straight, turning right, or turning left), creates and maintains predicted trajectories for each hypothesis, and maintains likelihood estimates of each hypothesis (e.g., object A is going straight with probability 90% considering the object pose/velocity and the trajectory poses/velocities). In an example, the world model module 402 uses an instance of the trajectory planner, which generates a reference driveline for each object hypothesis for at least some of the dynamic objects. For example, one or more instances of the trajectory planner can be used to generate reference drivelines for vehicles, bicycles, and pedestrians. In another example, an instance of the trajectory planner can be used to generate reference drivelines for vehicles and bicycles, and a different method can be used to generate reference drivelines (e.g., references paths) for pedestrians.

The objects maintained by the world model module 402 can include static objects and/or dynamic objects.

The route planning module 404 determines a road-level plan, such as illustrated with respect to a road-level plan 412. For example, given a starting location and a destination location, the route planning module 404 determines a route from the starting location to the destination location. For example, the route planning module 404 can determine the list of roads (i.e., the road-level plan) to be followed by the AV to navigate from the starting location to the destination location.

The road-level plan determined by the route planning module 404 and the objects (and corresponding state information) maintained by the world model module 402 can be used by the decision making module 406 to determine discrete-level decisions along the road-level plan. An example of decisions included in the discrete-level decisions is illustrated with respect to discrete decisions 414. An example of discrete-level decisions may include a decision to stop at the interaction between road A and road B, a decision to move forward slowly, a decision to accelerate to a certain speed limit, a decision to merge onto the rightmost lane, etc.

The trajectory planner 408 can receive the discrete-level decisions, the objects (and corresponding state information) maintained by the world model module 402, and the predicted trajectories and likelihoods of the external objects from the world model module 402. The trajectory planner 408 can use at least some of the received information to determine a detailed-planned trajectory for the autonomous vehicle.

For example, as illustrated with respect to a detailed-planned trajectory 416, the trajectory planner 408 determines a next-few-seconds trajectory. As such, and in an example where the next few seconds are the next 6 seconds (i.e., a look-ahead time of 6 seconds), the trajectory planner 408 determines a trajectory and locations for the autonomous vehicle in the next 6 seconds. For example, the trajectory planner 408 may determine (e.g., predict, calculate, etc.) the expected locations of the autonomous vehicle at several time intervals (e.g., every one-quarter of a second, or some other time intervals). The trajectory planner 408 can determine the detailed-planned trajectory based on predictable responses of other road users, as described, for example, with respect to FIG. 3.

The reactive trajectory control module 410 can handle situations that the autonomous vehicle may encounter but are unpredictable (e.g., cannot be handled) by the trajectory planner 408. Such situations include situations where the detailed-planned trajectory of the trajectory planner 408 was based on misclassification of objects and/or unanticipated situations that rarely occur. For example, the reactive trajectory control module 410 can modify the detailed-planned trajectory in response to determining that the static object to the left of the autonomous vehicle is misclassified. For example, the object may have been classified as a large truck; however, a new classification determines that it is a static road barrier wall. In another example, the reactive trajectory control module 410 can modify the detailed-planned trajectory in response to a sudden tire blowout of the autonomous vehicle. Other examples of unanticipated situations include other vehicles swerving suddenly (e.g., due to late decision to get to highway off-ramp or tire blowout) into the lane of the AV and pedestrians or other objects emerging suddenly from behind occlusions.

Figure 5:
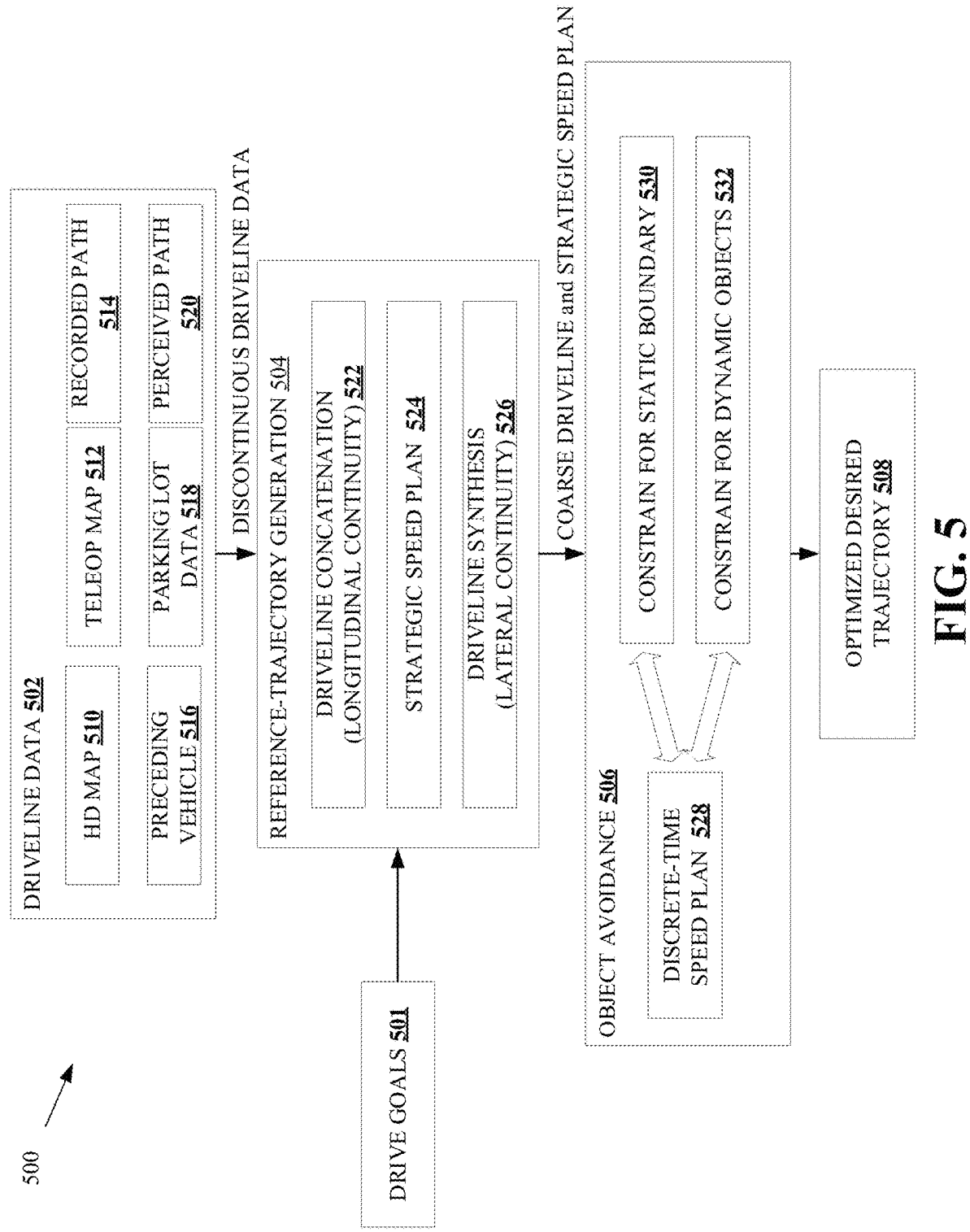
FIG. 5 is an example of layers of a trajectory planner for an autonomous vehicle.

FIG. 5 is an example of layers of a trajectory planner 500 for an autonomous vehicle. The trajectory planner 500 can be, or can be a part of, the trajectory planner 408 of FIG. 4. The trajectory planner 500 can receive drive goals 501. The trajectory planner 500 can receive a sequence of drive goals 501 that can represent, for example, a series of lane selections and speed limits that connect a first location to a second location. For example, a drive goal of the drive goals 501 can be "starting at location x, travel on a lane having a certain identifier (e.g., lane with an identifier that is equal to A123) while respecting speed limit y". The trajectory planner 500 can be used to generate a trajectory that accomplishes the sequence of the drive goals 501.

The trajectory planner 500 includes a driveline data layer 502, a reference-trajectory generation layer 504, an object avoidance layer 506, and a trajectory optimization layer 508. The trajectory planner 500 generates an optimized trajectory. Other examples of the trajectory planner 500 can include more, fewer, or other layers. In some examples, the layers can be combined; in other examples, a layer can be divided into one or more other layers.

The driveline data layer 502 includes the input data that can be used by the trajectory planner 500. The driveline data can be used (e.g., by the reference-trajectory generation layer 504) to determine (i.e., generate, calculate, select, or otherwise determine) a coarse driveline from a first location to a second location. The driveline can be thought of as the line in the road over which the longitudinal axis of the AV coincides as the AV moves along the road. As such, the driveline data is data that can be used to determine the driveline. The driveline is coarse, at this point, and may contain lateral discontinuities such as when directed to transition laterally between adjacent lanes. The driveline at this point is also not yet adjusted for objects encountered by the AV, as further described below.

In an example, the driveline data layer 502 can include one or more of High Definition (HD) map data 510, teleoperation map data 512, recorded paths data 514, preceding vehicle data 516, parking lot data 518, and perceived path data 520.

The HD map data 510 is data from a high-definition (i.e., high-precision) map, which can be used by an autonomous vehicle. The HD map data 510 can include accurate information regarding a vehicle transportation network to within a few centimeters. For example, the HD map data 510 can include details regarding road lanes, road dividers, traffic signals, traffic signs, speed limits, and the like.

The teleoperation map data 512 can include relatively short driveline data. For example, the teleoperation map data 512 can be driveline data that are 100 meters to 200 meters long. However, the teleoperation map data 512 is not necessarily so limited. The teleoperation map data 512 can be manually generated by a teleoperator in response to, or in anticipation of, exceptional situations that the AV is not capable of automatically handling.

The driveline may be created in real time. To illustrate creating the driveline in real time, an example is now provided. A teleoperator may be remotely observing the AV raw sensor data. For example, the teleoperator may see (such as on a remote monitor) construction-site pylons (e.g., captured by a camera of the AV) and draw a path for the AV through a construction zone. The teleoperator may then watch a flag person giving the go-ahead to the AV, at which point the teleoperator can cause the AV to proceed along the drawn path.

To reduce processing time of manually drawing the path when an AV reaches an exceptional situation that was previously encountered, the driveline data can also be stored remotely and sent to the AV as needed.

The recorded paths data 514 can include data regarding paths previously followed by the autonomous vehicle. In an example, an operator (e.g., a driver or a remote operator) of the autonomous vehicle may have recorded a path from the street into the garage of a home.

The preceding vehicle data 516 can be data received from one or more vehicles that precede the autonomous vehicle along a generally same trajectory as the autonomous vehicle. In an example, the autonomous vehicle and a preceding vehicle can communicate via a wireless communication link, such as described with respect to FIG. 2. As such, the autonomous vehicle can receive trajectory and/or other information from the preceding vehicle via the wireless communication link. The preceding vehicle data 516 can also be perceived (e.g., followed) without an explicit communication link. For example, the AV can track the preceding vehicle and can estimate a vehicle driveline of the preceding vehicle based on the tracking results.

The parking lot data 518 includes data regarding locations of parking lots and/or parking spaces. In an example, the parking lot data 518 can be used to predict trajectories of other vehicles. For example, if a parking lot entrance is proximate to another vehicle, one of the predicted trajectories of the other vehicle may be that the other vehicle will enter the parking lot.

In some situations map, (e.g., HD map) information may not be available for portions of the vehicle transportation network. As such, the perceived path data 520 can represent drivelines where there is no previously mapped information. Instead, the AV can detect drivelines in real time using fewer, more, or other than lane markings, curbs, and road limits. In an example, road limits can be detected based on transitions from one terrain type (e.g., pavement) to other terrain types (e.g., gravel or grass). Other ways can be used to detect drivelines in real time.

Figure 6:
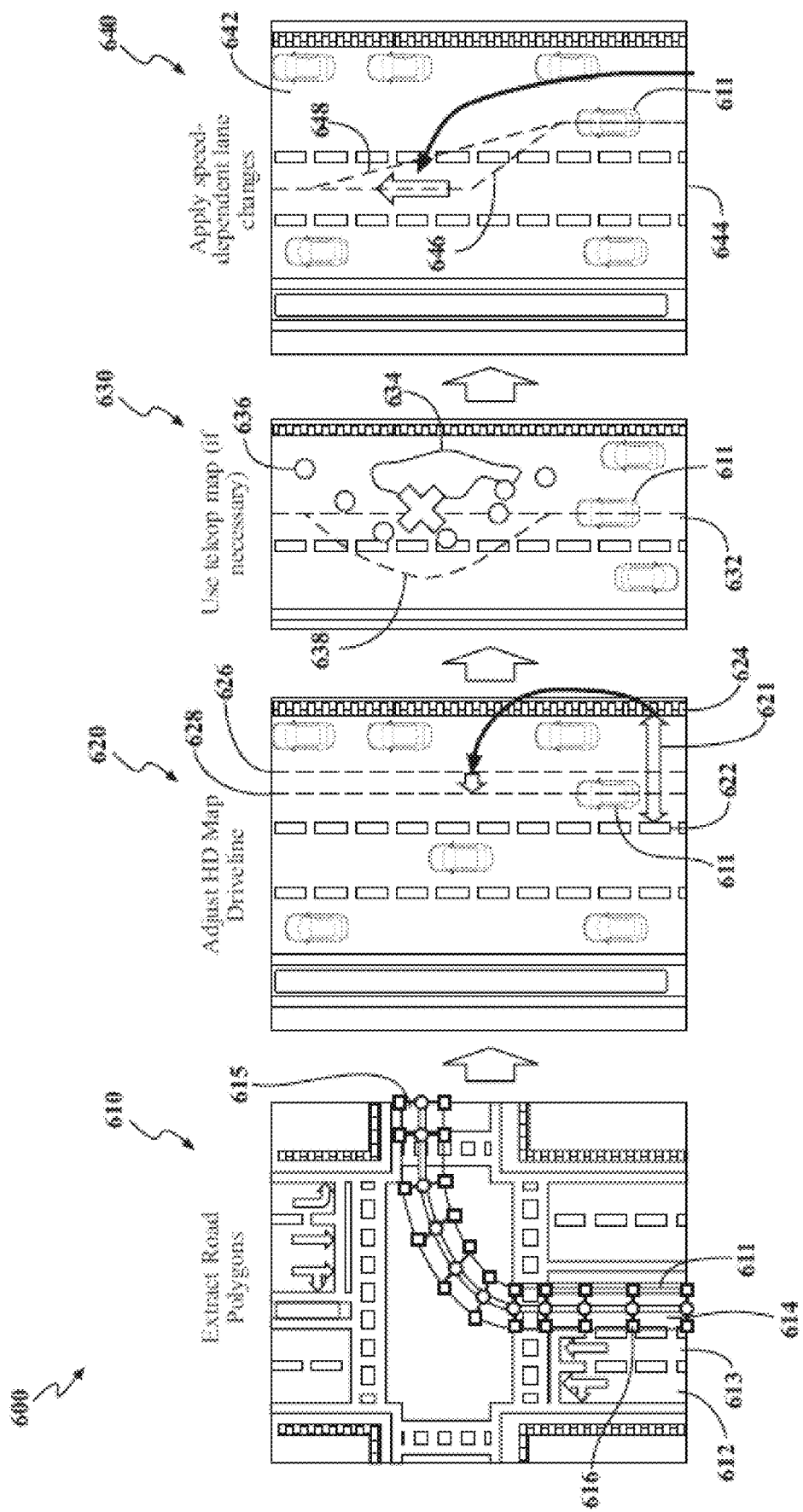
FIG. 6 is an illustration of examples of coarse-driveline concatenation.

The reference-trajectory generation layer 504 can include a driveline concatenation module 522, a strategic speed plan module 524, and a driveline synthesis module 526. The reference-trajectory generation layer 504 provides the coarse driveline to a discrete-time speed plan module 528. If an object is a static object and an adjusted drivable area is passable (e.g., the AV can pass through one or more gaps in the drivable area or the adjusted drivable area, as the case may be), then a module 530 can apply static constraints (e.g., lateral constraints) to determine an adjusted drivable area. A module 532 can determine (e.g., predict) the locations of the AV at different discrete points in time. That is, the module 532 determines locations of arrivals, along the coarse driveline, at different time points. If an object is a dynamic object and the object is a lateral constraint, then the module 532 can adjust the drivable area based on the arrival locations so as to avoid collisions. FIG. 6 illustrates an example of the operation of the reference-trajectory generation layer 504.

It is noted that the route planning module 404 can generate a lane ID sequence, which is used to travel from a first location to a second location thereby corresponding to (e.g., providing) the drive goals 501. As such, the drive goals 501 can be, for example, hundreds of meters apart, depending on the length of a lane. In the case of the HD map data 510, for example, the reference-trajectory generation layer 504 can use a combination of a location (e.g., GPS location, 3D Cartesian coordinates, etc.) and a lane (e.g., the identifier of the lane) in the sequence of the drive goals 501 to generate a high-resolution driveline (e.g., from the HD map 510) represented as series of poses for the AV. Each pose can be at a predetermined distance. For example, the poses can be one to two meters apart. A pose can be defined by more, fewer, or other quantities as coordinates (x, y, z), roll angle, pitch angle, and/or yaw angle.

As mentioned above, the driveline data can be used to determine (e.g., generate, calculate, etc.) a coarse driveline. The driveline concatenation module 522 splices (e.g., links, fuses, merges, connects, integrates, or otherwise splices) the input data of the driveline data layer 502 to determine the coarse driveline along the longitudinal direction (e.g., along the path of the autonomous vehicle). For example, to get from location A (e.g., work) to location D (e.g., home), to determine the coarse driveline, the driveline concatenation module 522 can use input data from the parking lot data 518 to determine a location of an exit from the work location parking lot to exit to the main road, can use data from the HD map data 510 to determine a path from the main road to the home, and can use data from the recorded paths data 514 to navigate into the garage at home.

The coarse driveline does not include speed information. However, in some examples, the coarse driveline can include speed limit information, which can be used (e.g., extracted) from the HD map data 510. The strategic speed plan module 524 determines specific speed(s) along the different portions of the coarse driveline. For example, the strategic speed plan module 524 can determine that, on a first straight section of the coarse driveline, the speed of the autonomous vehicle can be set to the speed limit of that first straight section; and on a subsequent second curved section of the coarse driveline, the speed of the autonomous vehicle is to be set to a slower speed. As such, the strategic speed plan module 524 computes a law-abiding (e.g., respecting speed limits and stop lines), comfortable (e.g., physically and emotionally), and physically realizable speed profile (e.g., speed versus distance along the driveline) for the coarse driveline considering the current state (e.g., speed and acceleration) of the AV but not considering other road users or static objects.

Once a strategic speed plan is determined by the strategic speed plan module 524, the driveline synthesis module 526 can adjust the coarse driveline laterally. Considering the strategic speed profile and the coarse driveline with lateral discontinuities, the driveline synthesis module 526 determines the start and end locations of the lane change and synthesizes a driveline connecting the two locations. The length of the lane change can be speed dependent.

The driveline synthesis module 526 can synthesize drivelines joining laterally-discontinuous locations in the coarse driveline. For example, assume that the HD map data 510 includes a first section of the coarse driveline that is on a first lane of a road but that a second section of the coarse driveline is on a second lane of the same road. As such there exists a lateral discontinuity in the coarse driveline. The driveline synthesis module 526 first determines a transition distance (or, equivalently start and end locations) over which the AV should transition from the first lane to the second lane. That is, the start position is the road position when the autonomous vehicle is to be controlled to start moving from the first lane to the second lane. The end position is the road position when the autonomous vehicle is to have completed the lane change. The lateral continuity module then generates new driveline data joining the start position in the first lane to the end position in the second lane.

The transition determined by the driveline synthesis module 526 can be speed dependent. For example, a shorter transition distance can be required for the AV to transition from the first lane to the second lane when the AV is moving at a slower speed than when the AV is moving at a higher speed. For example, in a heavy traffic situation where the autonomous vehicle is traveling at a slower speed (e.g., 15 MPH), 20 yards may be required for the transition; however, if the autonomous vehicle is traveling at a higher speed (e.g., 65 MPH), then the transition distance may be 100 yards. As such, the driveline synthesis module 526 can determine the transition position depending on the speed of the AV.

The output of the driveline synthesis module 526 is provided to the object avoidance layer 506. The output of the driveline synthesis module 526 includes the coarse driveline and the strategic speed plan. The object avoidance layer 506 generates a medium-term, discrete-time speed plan and lateral constraints on the coarse driveline. For discrete points in time the future (or, equivalently, at discrete locations along the path of the AV), the discrete-time speed plan module 528 determines (i.e., calculates) a respective desired speed for the AV.

At the object avoidance layer 506, and as further described below, using the coarse driveline, nearby static objects, and nearby dynamic objects and their predicted trajectories, the object avoidance layer 506 determines (e.g., extracts) a drivable area where the AV can be safely operated. Right and left boundaries are determined. Given a current speed of the AV, a real-time speed plan can be generated. The real-time speed plan can be used to estimate future locations of the AV. The future locations of the AV can be evaluated against future anticipated (e.g., predicted) locations of dynamic objects. The drivable area of the AV is adjusted to remove areas of the drivable area that correspond to (e.g., overlap) locations of the dynamic objects.

At the object avoidance layer 506, the coarse driveline is evaluated and/or adjusted for objects. The objects can be objects external to and proximal to the AV. As such, the objects can be the objects described with respect to the world model module 402 of FIG. 4. As such, given a current speed of the AV, the object avoidance layer 506 generates a real-time speed plan. Using the real-time speed plan, the object avoidance layer 506 can estimate future locations of the AV at discrete future time points. The future locations can be evaluated against the locations of the objects (i.e., the objects of the world model) to provide (e.g., generate) a smooth drive for the AV. Providing a smooth drive (i.e., a smooth trajectory) can be an iterative process, as further described below.

To summarize, a coarse driveline is first generated; a speed plan is then generated from the coarse driveline; and, given the coarse driveline and the speed plan, a trajectory is optimized in view of other objects that are maintained in the world model of the AV, to provide an optimized desired trajectory. The trajectory is optimized in an adjusted drivable area. Non-drivable areas (i.e., areas where the AV cannot be safely driven because of the other objects) are removed from a default drivable area to provide the adjusted drivable area.

FIG. 6 is an illustration of examples 600 of coarse-driveline concatenation. The examples 600 are examples of the operation of the reference-trajectory generation layer 504 of FIG. 5.

In a view 610, an AV 611 is in a rightmost lane 614 of a three-lane road that includes lanes 612-614. Note that the view 610 is an example of a left-hand traffic system (i.e., the traffic in the lanes 612-614 moves from the bottom towards the top of FIG. 6). A route planner, such as the route planning module 404, may have determined, based on HD map data, such as the HD map data 510 of FIG. 5, that the AV 611 is to turn right onto lane 615 of a one-lane road. The HD map may provide the centerline (not shown) for each lane.

In some situations, the driveline of the AV may not coincide with the centerline of a lane or road. For example, the lane 615 may be extra-wide to accommodate parking spaces along the left side of the lane 615. In another example, it may be found that most drivers prefer to drive slightly left of the centerline. As such, the driveline of the AV 611 is to be set to the left of the centerline of the lane 615. As such, the driveline concatenation module 522 determines the geometry of the lanes in order to determine the driveline given the lane geometry (e.g., the lane width). For example, when there is a turn in the coarse driveline, the driveline concatenation module 522 determines where the driveline is to be moved (i.e., off the lane centerline) based on the width of the lane, the turning direction (e.g., right or left), the turning angle, and/or the turning speed. That is, the driveline concatenation module 522 sets the driveline of the AV based on the HD map centerline. In an example, the driveline can be set based on the lane width.

To set the driveline of the AV, the driveline concatenation module 522 determines the geometry of lanes along the coarse driveline. In an example, the driveline concatenation module 522 determines the geometry for a certain distance (e.g., 100 meters, 200 meters, 300 meters, etc.) along the coarse driveline. To determine the geometry, the driveline concatenation module 522 can determine polygons, such as a polygon 616 along the coarse driveline, which can be used to define lane boundaries.

A view 620 illustrates determining the driveline (i.e., a coarse driveline) based on a width 621 of a lane. A right edge 624, a left edge 622, and a centerline 626 of a lane along which the AV 611 is traveling can be obtained from the HD map. The driveline concatenation module 522 determines the driveline 628 (i.e., the coarse driveline) based on the width 621. As such, the driveline 628 is shifted from the centerline 626.

A view 630 illustrates using teleoperation data, such as described with respect to the teleoperation map data 512 of FIG. 5, in order to determine a driveline. As described above, whereas the HD map data are static data, teleoperation data can provide a real-time driveline based on road conditions and/or exceptional situations. For example, a construction zone exists along a driveline 632 of the AV 611. The construction zone is bounded by obstacles, such as a pylon 636, which surround a construction project 634. As such, the driveline concatenation module 522 adjusts, as further described below, the driveline 632 to be a driveline 638 (i.e., a coarse driveline) using a real-time driveline that is provided by the teleoperation data.

A view 640 illustrates a speed-dependent lane change. The speed-dependent lane change can be implemented, as described above, by the driveline synthesis module 526 of FIG. 5. In an example, the decision making module 406 of FIG. 4 provides that the AV 611, traveling along a lane 642, is to be next in a lane 644, for example, because the lane 642 ends or because the AV 611 is to turn left. As such, the AV 611 is to move from the lane 642 to the lane 644 at some point. As the HD map may not provide lane transition information, the reference-trajectory generation layer 504 of the AV 611 determines the lane transition time. As mentioned above, the transition can be speed dependent.

In an example, the trajectory planner 500 (of which the reference-trajectory generation layer 504 is a layer) can determine that at a point X along the coarse driveline, the AV 611 will be moving at a speed Y (as determined by the strategic speed plan module 524). In a case where the AV 611 is moving at a low speed (e.g., 35 MPH), the driveline synthesis module 526 can determine that the transition can be slow. Accordingly, the path to move from the lane 642 to the lane 644 can be as shown by a path 646. On the other hand, if the AV 611 is traveling at a high speed (e.g., 65 MPH), the path to switch lanes requires a longer distance, as shown by a path 648.

The time required to follow the paths 646 and 648 can be the same. However, the distance is different. The distance required for the lane transition when the AV 611 is traveling at a first speed is longer than the distance required when the AV 611 is traveling at a second speed that is slower than the first speed.

A lane-change rate can be used to determine the speed-dependent lane change. That is, the lane-change rate can be used to create a connection between two adjacent lanes, such as the lane 642 and the lane 644 of the view 640. The lane-change rate can be defined in "meters per meter:" How many meters does the path move laterally per meter longitudinally? As mentioned above, the goal is to identify a lane change rate that leads to the completion of the lane change in a target amount of time: If the AV is travelling slowly (for example, during dense rush-hour traffic), the lane change rate is high and takes place over a short distance (e.g., on the order of tens of meters); if the AV is travelling quickly (e.g., at highway speeds), the lane change rate is slow and takes place over a long distance (e.g., on the order of hundreds meters).

Figure 7:
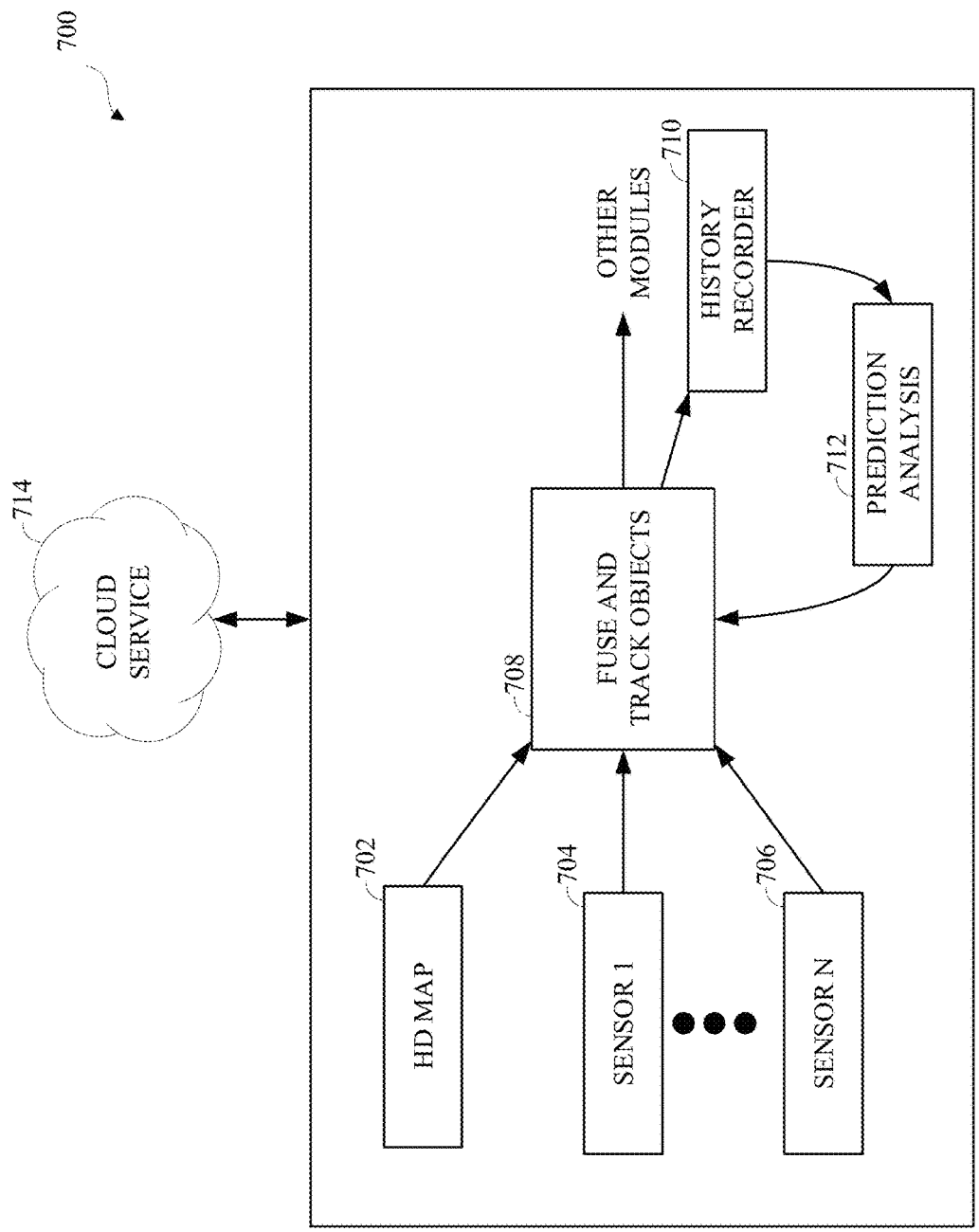
FIG. 7 is an example of a system for real-time map and prediction diagnostics.

FIG. 7 is an example of a system 700 for real-time map and prediction diagnostics. The system 700 can include an HD map module 702, one or more sensor modules 704-706, a fusing-and-tracking module 708, a history recorder 710, and a prediction analysis module 712.

The system 700 can be implemented in a vehicle (i.e., a host vehicle), such as the vehicle 100 of FIG. 1 or the vehicle 202 of FIG. 2. The system 700 can be implemented, at least partially, by, or be part of, a trajectory planner, such as the trajectory planner 408 of FIG. 4 or the trajectory planner 500 of FIG. 5. The system 700 can be implemented, at least partially, by, or be part of, a world model module, such as the world model module 402 of FIG. 4. The components (e.g., modules) of the system 700 can be implemented, for example, as one or more software programs that may be executed by a processor, such as the processor 120 of FIG. 1. The software program(s) can include machine-readable executable instructions that may be stored in a memory (e.g., a non-transitory computer-readable storage medium) such as the memory 122 of FIG. 1, and that, when executed by the processor, may cause the computing device to perform the functions of the modules of the system 700 including techniques described herein for road user categorization through monitoring.

The HD map module 702 can be, or can be as described with respect to, the map data 510 of FIG. 5. The HD map module 702 can be used to determine drivelines of mapped lanes. A mapped lane of a road is a lane for which the HD map module 702 includes information. A driveline is a line of a lane such that a longitudinal axis of a vehicle traversing the lane can be expected to align with the driveline. The driveline of a lane can be a center line of the lane or any other reference line of the lane. The HD map can also include pose information of a lane. Pose information of a lane as used herein can mean the heading (e.g., a bearing) of the lane at different discrete locations of the lane.

The one or more sensor modules 704-706 can receive sensor data from respective sensors, such as the sensor 126 of FIG. 1. As mentioned above, the one or more sensor modules 704-706 can be used to identify road users. In an example, the driveline of a lane may be determined using sensor data. For example, a driveline identifying module (not shown) can receive sensor data, identify lane boundaries based on the sensor data, and determine that the driveline of the lane is a median line of the lane. Any technique can be used to identify lane boundaries including, but limited to, identifying lane boundaries as described herein.

The fusing-and-tracking module 708, and as mentioned above, can fuse sensor data from several sensors together to determine (e.g., guess, infer, etc.) the identity (e.g., class, type, category, etc.) of the road users. In an example, the fusing-and-tracking module 708 can be, or can be part of, the world model module 402 of FIG. 4. As such, real-world objects (e.g., road users) can be detected based on received sensor data (also referred to herein as measurements or sensor observations). As mentioned herein, the fusing-and-tracking module 708 can predict one or more trajectories (i.e., hypotheses) for at least some of the detected road users.

The fusing-and-tracking module 708 can maintain (i.e., associate and update over time) respective state information with the road users. The fusing-and-tracking module 708 can use (e.g., fuse) data from the multiple types of sensors (e.g., cameras, LiDAR, radar, etc.) to estimate at least one of a velocity, a pose (position and heading), a trajectory, a class, and the like of road users that are external to the vehicle. The information maintained by the fusing-and-tracking module 708 can be used by other modules, as described herein.

The history recorder 710 can record for at least some (e.g., all) of the other road users identified by the fusing-and-tracking module 708 respective histories (e.g., trajectory histories). At each time step, the trajectory history of a road user can capture (e.g., include, etc.) a current pose and a corresponding mapped driveline pose of the lane that the road user is traversing (e.g., is driving in). The trajectory history can also include a current speed of the road user. The trajectory history can also include a current speed limit of the road. Each history entry in the trajectory history can be obtained at a discrete time step, $\Delta t$. The time step (e.g., increment, etc.) can be every 0.25 seconds, 0.5 seconds, or some other time step. The history recorder 710 can also record the predicted locations of a road user and the changes to those predictions over time, as described herein. The history of a road user can be maintained in a data structure, which can be as described with respect to FIG. 8.

Figure 8:
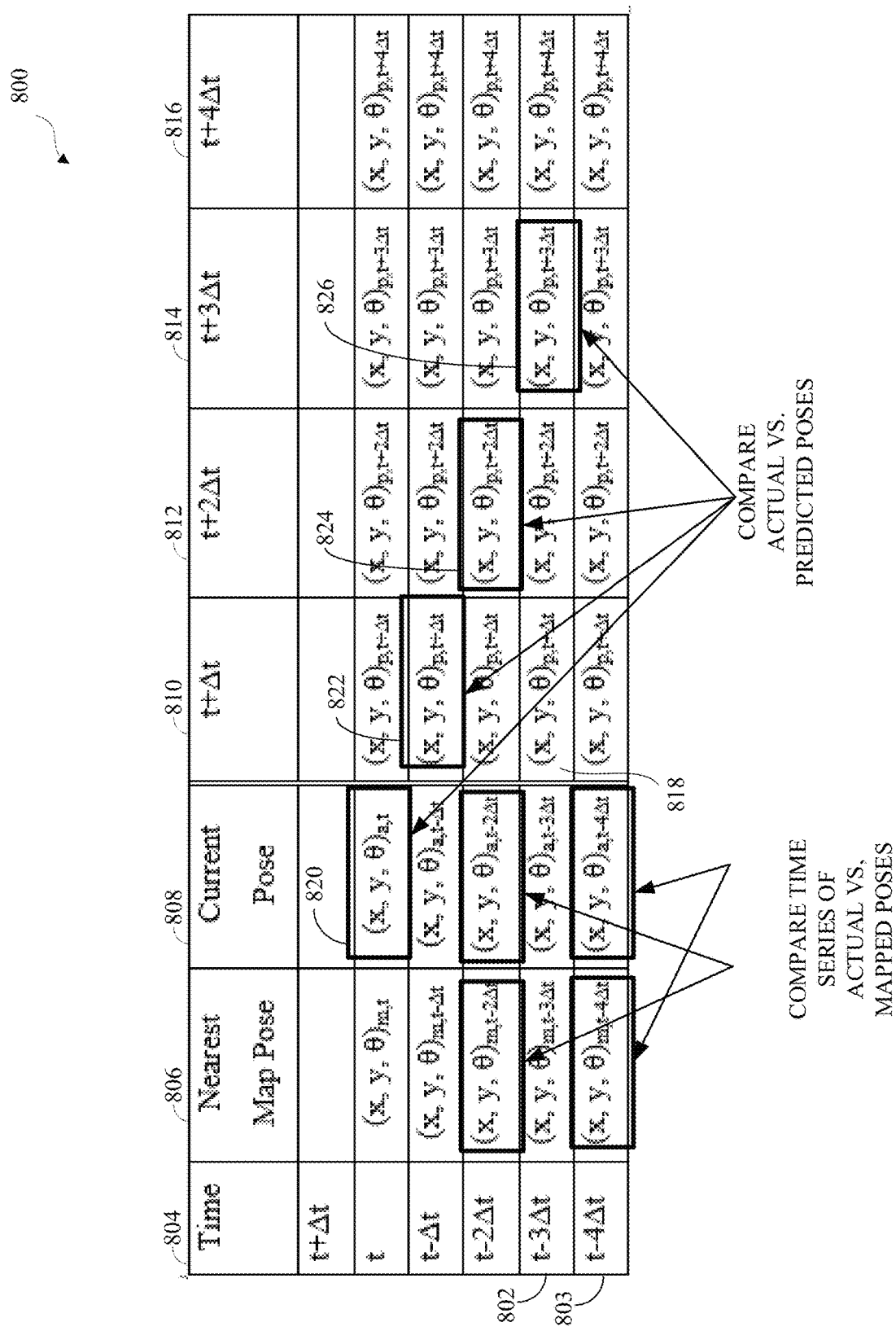
FIG. 8 is a diagram of an example of a data structure of a trajectory history of a road user.

FIG. 8 is a diagram of an example of a data structure 800 of a trajectory history of a road user. The data structure 800 can be a circular buffer, as described herein. The data structure 800 illustrates that the circular buffer includes six (6) slots. The data structure 800 can include more or fewer slots. In some implementations, the data structure 800 can include more, fewer, other information, or a combination thereof, than those shown in the example.

The data structure 800 can be a circular buffer. A circular buffer can be a first-in-first-out (FIFO) memory buffer of limited capacity. The circular buffer can be thought of as including a fixed number of slots, N. A first history entry can be stored at a first slot of the circular buffer, a second history entry can be stored at a second slot of the circular buffer, and an $N^{th}$ history entry can be stored at the $N^{th}$ slot of the circular buffer. An $(N+1)^{th}$ history entry can be stored at the first slot of the circular buffer, thereby replacing (e.g., overwriting) the first history entry, an $(N+2)^{th}$ history entry can be stored at the second slot of the circular buffer, thereby replacing (e.g., overwriting) the second snapshot, and so on.

Each row in the data structure 800, such as a history entry 802, is referred to herein as a history entry. The data structure 800 is shown as including columns 804-816, which are described below using the history entry 802. In other implementations, the data structure 800 can include more, fewer, other columns, or a combination thereof.

The data structure 800 illustrates that history entries are captured (e.g., stored in the data structure 800) at time increments of $\Delta t$, as shown in a time column 804. In some implementations, the data structure 800 may not include the time column 804 as the time step corresponding to a particular history entry can be inferred, such as based on the time increments of capturing and storing data points and the location (e.g., position, order, etc.) of the particular history entry in the data structure 800. The data structure 800 illustrates that the circular buffer currently includes five (5) history entries and that a new history entry would be added next at time t+$\Delta t$.

A current-pose column 808 includes coordinates (e.g., positions) and headings of the road user at (e.g., as observed at) the respective time steps. The coordinates and the heading of a data point are referred to together as a pose of the road user. The poses of the road user (i.e., the values in the current-pose column 808) can be obtained using sensor data, as described herein. The poses of the road user may also be received from the road user, which may broadcast its poses; from an infrastructure element, which may track and broadcast the poses of the road user; from another road user, which may track and broadcast the poses of the road user. Other ways of receiving the poses of the road user are possible.

The road user poses illustrated in the current-pose column 808 have a similar format to the road user pose $(x, y, \theta)_{a,t-3\Delta t}$ of the history entry 802. The road user pose $(x, y, \theta)_{a,t-3\Delta t}$ has the following semantics: (x, y) indicate the lateral and longitudinal position of the road user; the angle $\theta$ indicates the heading of the road user; the subscript "a" indicates that the data point is an actual (e.g., observed, sensed, etc.) pose of the road user; and the subscript time (e.g., t−3$\Delta t$) indicates that the road user pose was observed 3$\Delta t$ seconds prior to the current time t.

A map-pose column 806 can include the nearest poses in the HD map corresponding to the road user poses in the current-pose column 808. A nearest pose in the HD map can be a data point on a driveline of a lane of the road user. The map poses illustrated in the map-pose column 806 have a similar format to the map pose $(x, y, \theta)_{m,t-3\Delta t}$ of the history entry 802. The map pose $(x, y, \theta)_{m,t-3\Delta t}$ has the following semantics: (x, y) indicate the lateral and longitudinal location of the driveline location; the angle $\theta$ indicates the heading of the driveline at the map location $(x, y)_m$; the subscript "m" indicates that the data point is obtained from an HD map; and the subscript time (e.g., t−3$\Delta t$) indicates that the map pose is the nearest map pose to the observed road user pose observed 3$\Delta t$ seconds prior to the current time t.

At each time step, the data structure 800 can include the predictions of future poses of the road user. At a given time step, the data structure 800 can include data points corresponding to future time steps in a look-ahead window. The data structure 800 illustrates four predicted poses (corresponding to the columns 810-816). However, the data structure 800 can include more or fewer predictions of future poses.

The predictions of future poses illustrated in the current-pose column 808 have a similar format to a predicted future position $(x, y, \theta)_{p,t+3\Delta t}$ (i.e., a predicted pose 818). The predicted pose 818 indicates that at time step t−3$\Delta t$ (i.e., 3$\Delta t$ seconds ago from a current time t), the road user was predicted to be, to have, or to be at, pose $(x, y, \theta)_{p,t+3\Delta t}$, where the subscript "p" indicates that this is a predicted pose and (t+$\Delta t$) indicates in "in $\Delta t$ seconds." It is noted that the time t−3$\Delta t$ was itself the current time when the predictions of the future poses of the road user were made. As such, at (t−3$\Delta t$), and again referring to the history entry 802, the road user was predicted to be at, or have, the poses $(x, y, \theta)_{p,t+\Delta t}$, $(x, y, \theta)_{p,t+2\Delta t}$, $(x, y, \theta)_{p,t+3\Delta t}$, and $(x, y, \theta)_{p,t+4\Delta t}$ in $\Delta t$ seconds from (t−3$\Delta t$), 2$\Delta t$ seconds from (t−3$\Delta t$), 3$\Delta t$ seconds from (t−3$\Delta t$), and 4$\Delta t$ seconds from (t−3$\Delta t$), respectively. The predictions provide information regarding where the road user will be in the future. While not specifically shown in FIG. 8, the data structure 800 can include predictions corresponding to each of the hypotheses associated with the road user.

In an example, the data structure 800 may not include the map-pose column 806. Rather, the values of map-pose column 806 can be obtained from the HD map module 702 on demand. For example, responsive to receiving a given road user pose (x, y, θ) (i.e., a value of the current-pose column 808) or at least the coordinates (x, y), the HD map module 702 can provide the nearest map pose data $(x, y, \theta)_m$ included in the HD map. The road user poses $(x_i, y_i)_a$ can be, can be considered to be, or can be used to obtain, lateral errors (i.e., the lateral-offset values). The angles $(\theta_i)_a$ can be, can be considered to be, or can be used to obtain heading errors relative to a lane (i.e., relative to a mapped heading of the lane $(\theta_i)_m$).

In an example, the data structure 800 may include a Lane ID column, which can indicate an identifier of a lane that the road user was traversing at the time that the history entry was captured. As mentioned above, each lane in the HD map can be associated with an identifier. As such, the Lane ID column can include the lane identifiers as obtained from the HD map module 702. In some implementations, the data structure 800 may not include the lane identifier (i.e., Lane ID) as the lane identifier can be implied from (e.g., derived from, obtained from, implicit in, etc.) at least one of the road user pose or the map Pose. For example, responsive to receiving a given map pose $(x, y, \theta)_m$ or at least the coordinates $(x, y)_m$, the HD map module 702 can provide the corresponding Lane ID.

In an example, the data structure 800 can include speed data of the road user. The speed data can be stored in a user-speed column. The speed data of the road user can include the observed speeds of the road user at the different time steps. In an example, the data structure 800 can include speed limit data. The speed limit data can be stored in a speed limit column. The speed limit data can include the speed limits, which may be obtained from the HD map, at the locations given by the map poses of the map-pose column 806, given Lane IDs, or given road user poses of the current-pose column 808. The data structure 800 may not include the speed limit data as the speed limit data may be obtained from the HD map module 702 as (e.g., when, if, etc.) needed. For example, responsive to receiving a given map pose, a road user pose, or a lane ID, the HD map module 702 can provide the speed limit.

Figure 9:
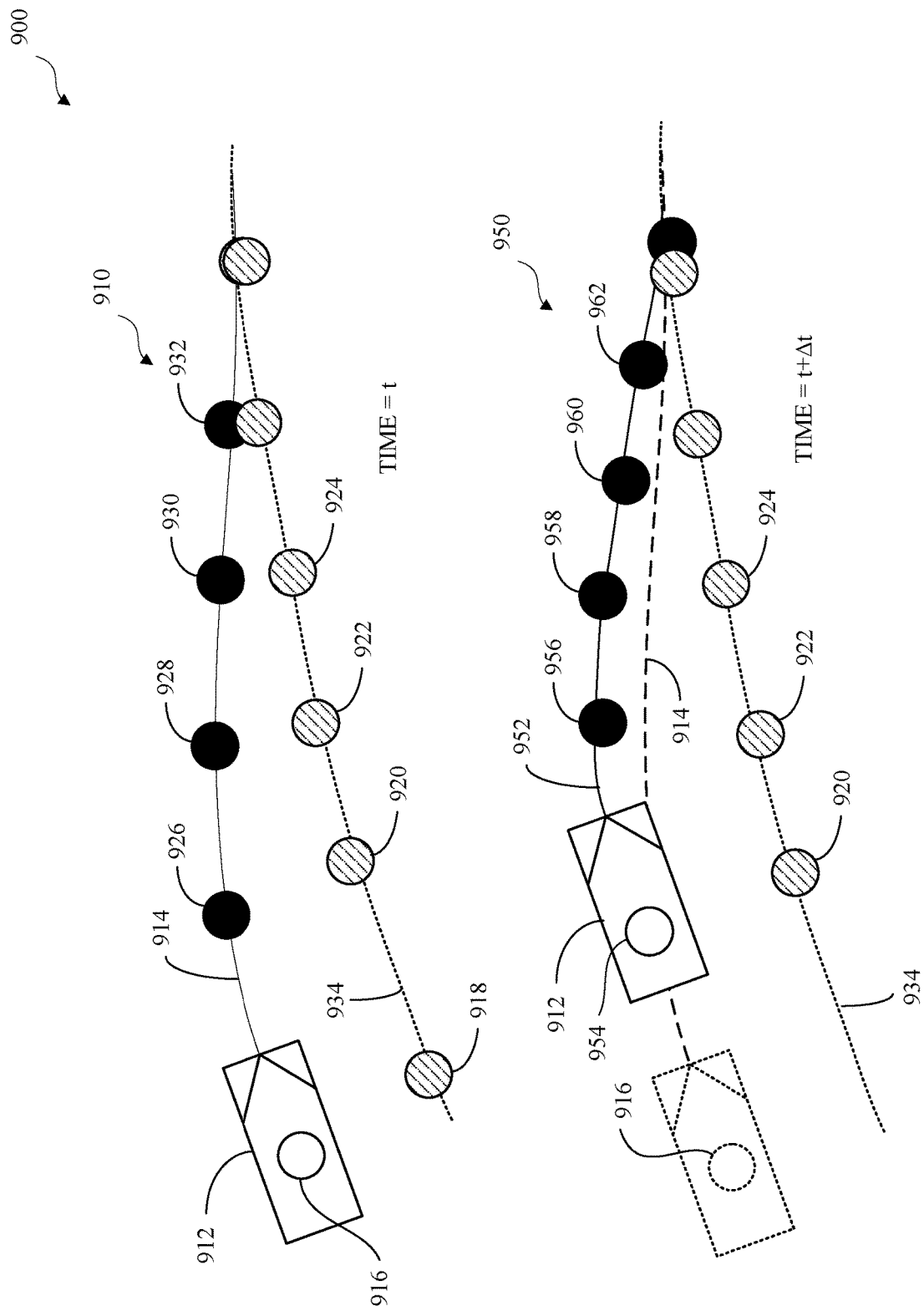
FIG. 9 is a diagram illustrating an example 900 of predicting a trajectory of a road user.

FIG. 9 is a diagram illustrating an example 900 of predicting a trajectory of a road user. The example 900 includes a road user 912 that can be identified and tracked as described herein. A scene 910 illustrates predicting a first trajectory 914 of the road user 912 at a first time t; and a scene 950 illustrates predicting a second trajectory 952 of the road user 912 at a second time t+Δt, where Δt is the time step.

The scenes 910, 950 illustrate that the road user 912 has (e.g., is detected to have, etc.) a first pose 916 at the time t and a second pose 954 at the second time t+Δt, respectively. The history recorder 710 of FIG. 7 can add the first pose 916 and the second pose 954 to the data structure 800 of FIG. 8 in the current-pose column 808.

Figure 10A:
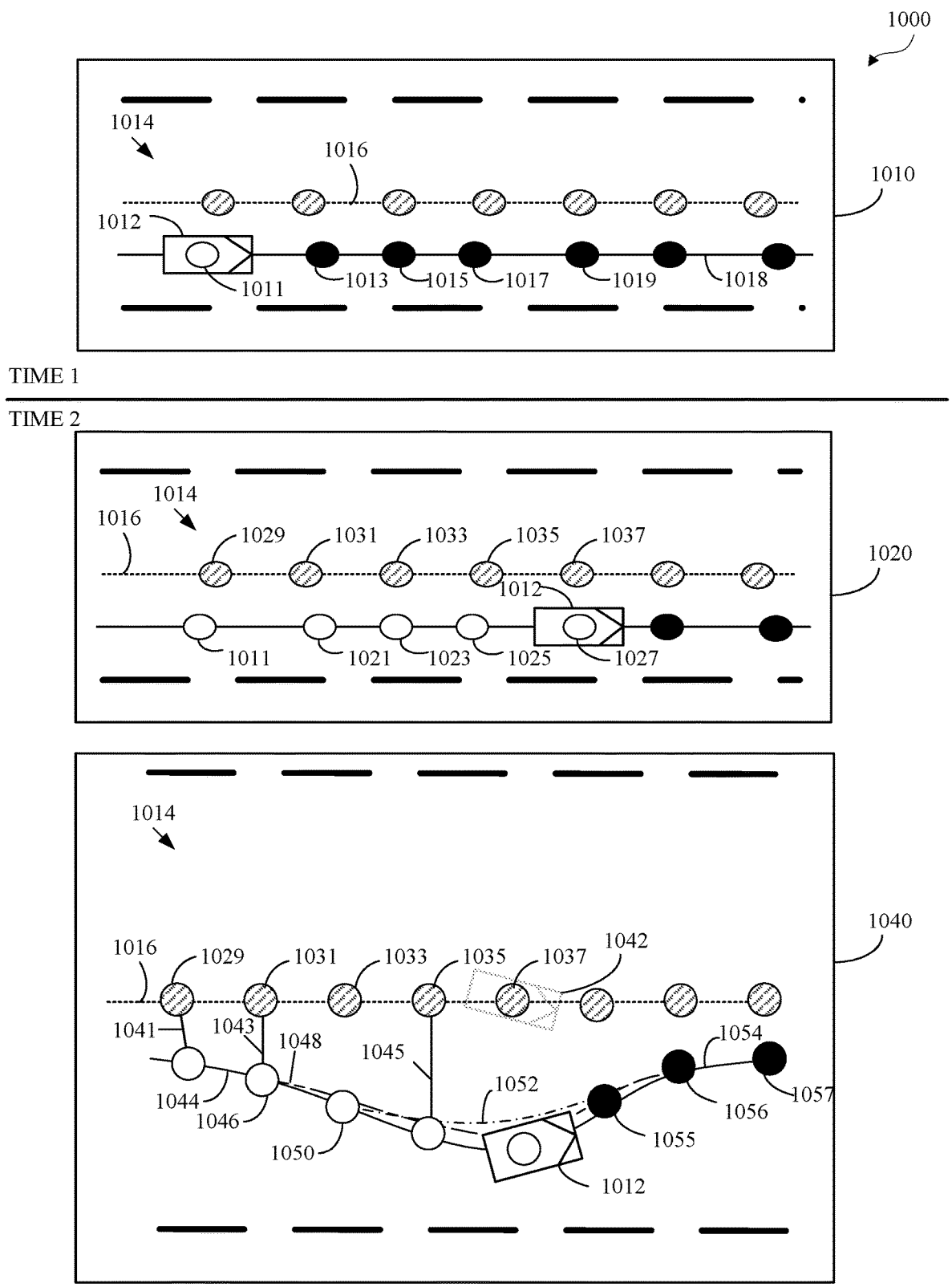
FIGS. 10A-10B illustrate examples of real-time map and prediction diagnostics.
Figure 10B:
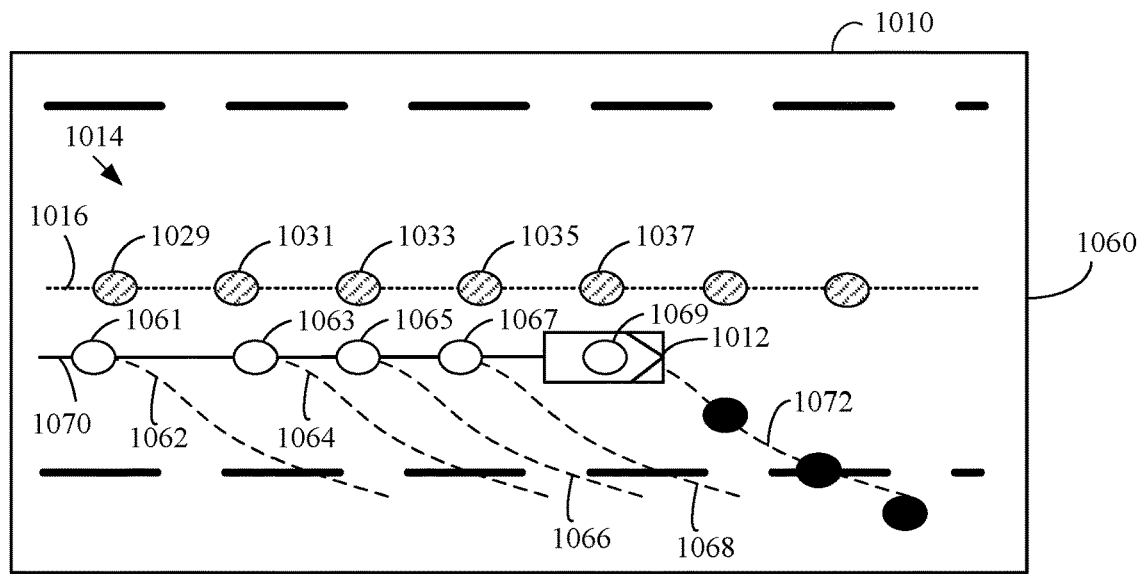

In FIGS. 9 and 10A-10B, circles filled with the upward diagonal pattern (e.g., mapped poses 918, 920, 922, 924) illustrate the information (map poses) available in an HD map, as described above with respect to the map-pose column 806 of FIG. 8. The mapped poses 918, 920, 922, 924 are poses along a driveline 934, which may be a center line of a lane (not shown) in which the road user 912 is traveling; solid-color filled circles (e.g., predicted poses 926, 928, 930, 932, 956, 958, 960, 962) illustrate predicted poses of the road user 912, as described with respect to the columns 810-816 of FIG. 8; and empty circles (e.g., 916, 954) illustrate actual (e.g., observed, sensed, etc.) poses of the road user 912, as described with respect to the current-pose column 808 of FIG. 8.

A predicted trajectory (such as the first trajectory 914 and the second trajectory 952) consists of a sequence of predicted object states (which can include poses) at future time points. The predicted states include respective predicted positions at the future time points.

The scene 910 illustrates that, at time t (when the first trajectory 914 is predicted), predicted future states (including positions) of the road user 912 include the predicted pose 926 at a time t+Δt, the predicted pose 928 at a time t+2Δt, the predicted pose 930 at a time t+3Δt, and the predicted pose 932 at a time t+4Δt. The scene 950 illustrates that, at time t+Δt (when the second trajectory 952 is predicted), predicted states (including positions) of the road user 912 include the predicted pose 956 at a time (t+Δt)+Δt, the predicted pose 958 at a time (t+Δt)+2Δt, the predicted pose 960 at a time (t+Δt)+3Δt, and the predicted pose 962 at a time (t+Δt)+4Δt. At represents a time step (e.g., 0.5 seconds, 1 second, etc.). Between the time t and the time t+Δt, the road user 912 moves from the first pose 916 to the second pose 954.

FIGS. 10A-10B illustrate examples 1000 of real-time map and prediction diagnostics. FIG. 10A includes scenes 1010, 1020, and 1040, and FIG. 10B includes scenes 1060 and 1080. The scene 1010 illustrates a scene at a first time Time 1. The scenes 1020, 1040, 1060, 1080 illustrate different situations of how the scene 1010 may evolve and may be understood at a time Time 2 that is later than the Time 1. The scenes 1020, 1040, 1060, 1080 illustrate different levels of scene understandings.

The prediction analysis module 712 of FIG. 7 can determine (e.g., select, calculate, infer, output, etc.) a scene understanding value (e.g., class, category, rating, etc.) based on an AMDE, an APDE, or a combination thereof.

In an example, a map accuracy may be obtained based on the AMDE. The map accuracy may be a value selected from a set of map accuracy categories that includes the values {Map OK, Unknown, Map Issue}. Other values (e.g., labels, ordinals, numeric, etc. values) of the map accuracy are possible. In an example, a prediction accuracy may be obtained based on the APDE. The prediction accuracy may be a value selected from a set of prediction accuracy categories that includes the values {Prediction OK, Prediction Issue}. Other values of the prediction accuracy are possible.

In an example, the scene understanding can be, can include, or can be based on a combination of the map accuracy and the prediction accuracy. The scene understanding may be a value selected from a set of scene understanding categories where the categories range from good scene understanding to poor scene understanding. The set of scene understanding categories can include the values {Map OK and Prediction OK, Predictions OK and Map issues, Map OK but Prediction issues, Map issues and Prediction issues}, where the category Map OK and Prediction OK corresponds to good scene understanding, and the category Map issues and Prediction issues corresponds to poor scene understanding.

Referring again to FIGS. 10A-10B, at the Time 1 of the scene 1010, the fusing-and-tracking module 708 of FIG. 7 may detect (and track) that a road user 1012 is traversing a lane 1014, which has a mapped driveline 1016. At the Time 1, the road user 1012 is detected to have a pose 1011 and is predicted to follow the trajectory 1018 including predicted poses 1013, 1015, 1017, 1019. The history recorder 710 can record (e.g., store, save, etc.) the predicted poses 1013, 1015,1017, 1019 in the columns 810-816 of the data structure 800 of FIG. 8, respectively, in the row corresponding to Time 1.

In the scene 1020, which is at the Time 2, the road user 1012 is observed to currently have a pose 1027 corresponding to the predicted pose 1019. The history recorder 710 records, such as in the current-pose column 808 of the data structure 800 of FIG. 8, the observed poses 1011, 1021, 1023, 1025, 1027. The history recorder 710 records, such as in the map-pose column 806 of the data structure 800, the mapped poses 1029, 1031, 1033, 1035, 1037.

The prediction analysis module 712 can obtain the AMDE using corresponding values stored in the map-pose column 806 and the current-pose column 808. For example, every predetermined number of history entries can be used to obtain a corresponding AMDE. In an example, an AMDE value can be obtained using all the history entries of the data structure 800 each time a new history entry is added. In another example, the AMDE can be obtained every predetermined time period (e.g., 1 second, 3 seconds, or some other time predetermined period of time). In a case that the data structure 800 includes entries obtained in a period longer than the predetermined time period, the prediction analysis module 712 can obtain the AMDE using the most recent history entries constituting the predetermined period of time. Pairwise differences (i.e., distances) between the values of the map-pose column 806 and the values of the current-pose column 808 can be averaged to obtain the AMDE.

In an example, the AMDE can be obtained at each time step. The AMDE between two points can be calculated as the distance between a current pose (e.g., location) of the road user to the nearest mapped driveline pose. The AMDE can be indicative of the accuracy of the HD map. To illustrate, for a particular history entry (e.g., a history entry 803 of FIG. 8) of the data structure 800, the AMDE can be calculated as the distance between the point defined by the road user pose (e.g., $(x, y)_{m,t-4\Delta t}$) and the corresponding road user pose (e.g., $(x, y)_{a,t-4\Delta t}$). As is known, the distance can be calculated as $$d = \sqrt{(x_{m,t-4\Delta t} - x_{a,t-4\Delta t})^2 + (y_{m,t-4\Delta t} - y_{a,t-4\Delta t})^2}.$$

Other ways of obtaining the AMDE are possible.

The prediction analysis module 712 can obtain the APDE by comparing actual poses (e.g., an actual pose 820 of FIG. 8) to respective predicted poses of the actual poses (e.g., the predicted poses 822, 824, 826 of FIG. 8). The actual pose 820 is the observed pose of the road user a current time t. At time (t−Δt), the fusing-and-tracking module 708 of FIG. 7 predicted that at time t, the road user would have the predicted pose 822; at time (t−2Δt), the fusing-and-tracking module 708 of FIG. 7 predicted that at time t, the road user would have the predicted pose 824; at time (t−3Δt), the fusing-and-tracking module 708 of FIG. 7 predicted that at time t, the road user would have the predicted pose 826; and so on. The APDE is a measure of the accuracy of the prediction. An average distance can obtained between an actual pose and a predetermined number (e.g., 2, 3, or other predetermined number) of predicted poses of the actual pose.

Figure 10B:
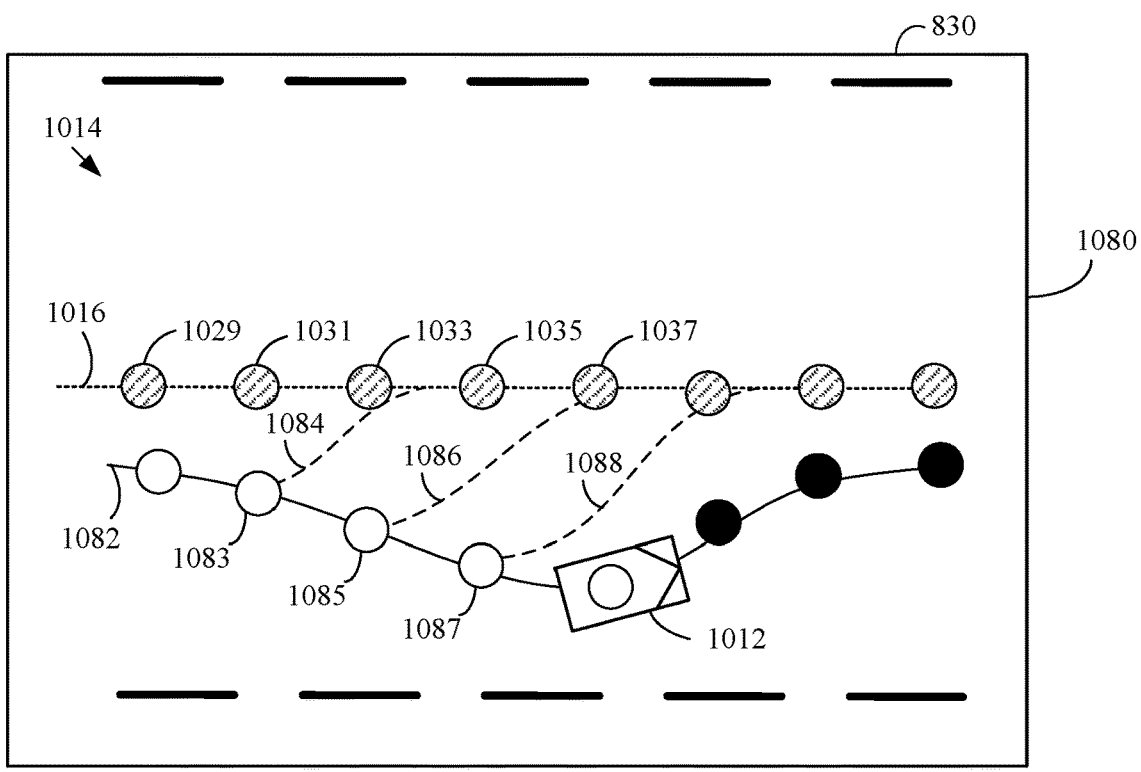

With respect to the scene 1020 of FIG. 10, the prediction analysis module 712 may determine that the APDE is low (i.e., the road user is following the predicted trajectory). As such, the prediction accuracy can be categorized as Prediction OK. The prediction analysis module 712 may determine that the AMDE is low (i.e., the road user 1012 is driving sufficiently close to the driveline 1016). As such, the map accuracy can be categorized as Map OK. The prediction analysis module 712 can identify the scene understanding as Map OK and Prediction OK.

In the scene 1040, which is at the Time 2, the fusing-and-tracking module 708 detected a static object 1042 along the driveline 1016. When the road user 1012 had the actual pose 1046, the road user 1012 was predicted to follow the trajectory 1048 to get around the static object 1042; when the road user 1012 had the pose 1050, the road user 1012 was predicted to follow the trajectory 1052; and when the road user 1012 has the current pose, the road user 1012 is predicted to follow the trajectory 1054, which includes the predicted poses 1055, 1056, 1057 and which are added to the data structure 800 as described herein. While not specifically shown in the scene 1040, the history recorder 710 also records predicted poses of the trajectories 1048 and 1052 in the data structure 800 of FIG. 8. The history recorder 710 records the actual poses of the road user 1012 along the trajectory 1044, including the actual poses 1046 and 1050.

The prediction analysis module 712 obtains the APDE as described herein. The prediction analysis module 712 determines that the APDE is low, which indicates a low error associated with the predictions and that the road user 1012 is following closely the predicted trajectory of the road user 1012. As such, the prediction accuracy can be categorized is Prediction OK.

The prediction analysis module 712 obtains the AMDE as described herein. The AMDE values are calculated (e.g., observed, etc.) to be increasing, as shown with respect to laterals 1041, 1043, 1045. As such a large AMDE may be obtained. However due to the presence of the static object 1042 in the scene, which is not included in (e.g., part of, etc.) the HD map, the AMDE may not be due to a map inaccuracy; rather the large AMDE may be due to the presence of the static object 1042. As such, the map accuracy can be categorized as Unknown. The prediction analysis module 712 can identify the scene understanding as Prediction OK and Map Unknown, or simply as Prediction OK. In an example, a low uncertainty can be associated with the map accuracy. In an example, the prediction analysis module 712 may indicate Map issues with a high uncertainty, which is due to the presence of the static object 1042.

With respect to the scene 1060, the prediction analysis module 712 can categorize the map accuracy Map OK, as described with respect to the scene 1020. When the road user 1012 had poses 1061, 1063, 1065, 1067, the fusing-and-tracking module 708 predicted that the road user 1012 would follow the trajectories 1062, 1064, 1066, 1068, respectively. However, the road user 1012 is observed to continue to follow the trajectory 1070. By comparing, as described herein, the predicted poses of the road user 1012 with the observed (e.g., actual) poses of the road user 1012, the prediction analysis module 712 can determine that the APDE is high. As such, the prediction analysis module 712 can categorize the prediction accuracy as Prediction Issue. The prediction analysis module 712 can identify the scene understanding as Map OK and Prediction Issue.

With respect the scene 1080, the prediction analysis module 712 can categorize the map accuracy as Map Issue since the AMDE values are determined to be increasing (i.e., a high AMDE) and, unlike the scene 1040, the increase is not due to any other object in the scene. The prediction analysis module 712 can determine that the mapped driveline is not what the road user 1012 is following as the road user 1012 is following a trajectory 1082. Furthermore, the prediction analysis module 712 determines that the APDE is high. When the road user 1012 had poses 1083, 1085, 1087, the fusing-and-tracking module 708 predicted that the road user 1012 would follow the trajectories 1084, 1086, 1088, respectively. However, the road user 1012 is observed to continue to follow the trajectory 1082. As such, the prediction analysis module 712 can categorize the prediction accuracy as Prediction Issue. The prediction analysis module 712 can identify the scene understanding as Map Issue and Prediction Issue.

In an example, responsive to the prediction analysis module 712 identifying poor scene understanding (e.g., at least one of Map issue or Prediction Issue), control of the vehicle can be handed off to a human driver. In an example, scene understanding can be used to categorize other users, such as to categorize a driving behavior of the road user. For example, with respect to the scene 1080, the road user 1012 may be categorized as a non-safe (e.g., distracted, inebriated, etc.) driver since the road user 1012 is not following the driveline 1016 and does not seem to be driving according to predicted trajectories. For example, with respect to the scene 1020 or the scene 1040, the road user may be categorized as a normal driver.

In response to identifying the road user as a non-safe road user, the host vehicle can autonomously perform a driving maneuver to avoid the non-safe road user. The driving maneuver can include a maneuver to avoid driving in a blind spot of the road user. The driving maneuver can include a maneuver to maintain a large driving distance between the host vehicle and the road user. The driving maneuver can include a maneuver to pass the road user. Other driving maneuvers are possible.

As mentioned above, the host vehicle can maintain several hypotheses for the road user. In an example, the likelihood associated with a hypothesis can be updated using at least one of the APDE or AMDE. For example, using the APDE, AMDE, or both associated with respective hypotheses, the system 700 can inform the trajectory planner, the world model module or other modules of the host vehicle of the likelihood of a given hypothesis being true.

In an example, the map accuracy and the prediction accuracy can be transmitted to server, such as a cloud server 714 of FIG. 7. The cloud server 714 can receive map accuracy and the prediction accuracy data from multiple host vehicles. The cloud server 714 can aggregate the received data. The cloud server 714 can transmit the aggregated data to agents. The agents receiving the aggregated data can better plan the routes and avoid congestion.

In another example, infrastructure elements (e.g., infrastructure sensors of the vehicle transportation network) can obtain current poses of road users and transmit the poses to the cloud server 714. The cloud server 714 may also predict trajectories of the road users. The cloud server 714 can perform functions similar to those described with respect to the prediction analysis module 712 of FIG. 7. For a particular road user, the cloud server 714 can transmit the map accuracy and the prediction accuracy information to other agents in the vicinity of the road user.

In an example, responsive to AMDE data indicating map inaccuracies in a particular road section, the trajectory planner of FIG. 5 can plan trajectories according to the observed drivelines instead of the drivelines of the HD map. For example, if the host vehicle (i.e., the system 700 of FIG. 7) observes, or the cloud server 714 determines, that road users traversing a portion of the vehicle transportation network consistently have high AMDE values (within a distribution), then the trajectory planner of a host vehicle can be informed to obtain trajectories using a modified driveline that is offset from the mapped driveline according to the AMDE (e.g., an average AMDE). In an example, the HD map may be modified to include the modified driveline.

Time-series data of the APDE and the AMDE can be used for decision making in a number of ways. That is, several values (e.g., a trend) of the APDE or the AMDE can be used for decision making. Any number of the calculated APDE or AMDE values can be used. In an example, a number of calculated APDE or AMDE values that is equal to the size of the circular buffer can be used. In an example, the number of APDE or AMDE values to be calculated before a decision is made can be determined according to the speed limit, the uncertainty associated with the AMDE and APDE calculations, other criteria, or a combination thereof.

Several hypotheses may be associated with a road user, as described above. To illustrate, the hypotheses go-straight and turn-left may be associated with the road user. An increasing APDE on the turn-left hypothesis can be used as an indicator that the road user is not in fact turning left. As such, the APDE can be used to reduce the likelihood of the turn-left hypothesis. In another example, an increasing APDE on both of the hypotheses can be used to indicate that the prediction algorithm of the host vehicle is not correctly associating hypotheses with the road user. The road user may in fact be turning to a parking lot entry on the right when the prediction algorithm predicted one of go-straight or turn-left. In an example, the AMDE can be retrospectively used as an indicator that a map section should to be improved or that the map data should be modified (e.g., modifying the HD map drivelines) according to observed behaviors of road users.

Figure 11:
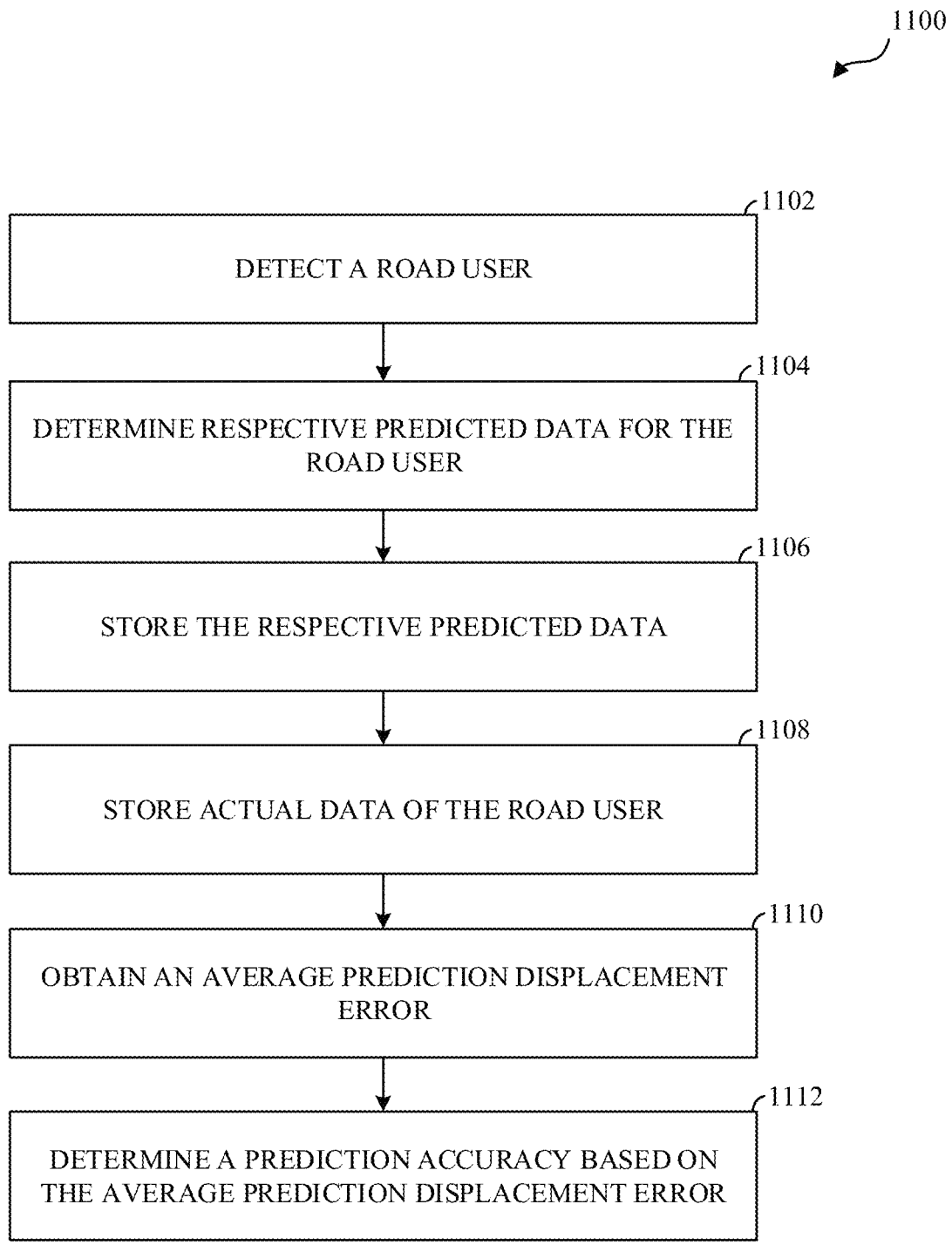
FIG. 11 is flowchart of a technique for determining prediction errors.

FIG. 11 is flowchart of a technique 1100 for determining prediction errors. The technique 1100 can be implemented in a vehicle (i.e., a host vehicle, an apparatus), such as the vehicle 100 of FIG. 1 or the vehicle 202 of FIG. 2. The technique 1100 can be implemented can be implemented by the system 700 of FIG. 7. The technique 1100 can be implemented, at least partially, by a trajectory planner, such as the trajectory planner 408 of FIG. 4 or the trajectory planner 500 of FIG. 5. The technique 1100 can be implemented, at least partially, by a world model module, such as the world model module 402 of FIG. 4. The technique 1100 can be implemented, for example, as one or more software programs that may be executed by a processor, such as the processor 120 of FIG. 1. The software program(s) can include machine-readable executable instructions that may be stored in a memory (e.g., a non-transitory computer-readable storage medium) such as the memory 122 of FIG. 1, and that, when executed by the processor, may cause the computing device to perform the technique 1100.

At 1102, the technique 1100 detects a road user. The road user can be detected using sensors of the host vehicle, as described with respect to FIG. 7. At 1104, the technique 1100 determines respective predicted data for the road user. For example, the predicted data can be as described with respect to the columns 810-816 of FIG. 8. At 1106, the technique 1100 stores, in a data structure, the respective predicted data, as described with respect to FIG. 8. At 1108, the technique 1100 stores, in the data structure, actual data of the road user. The actual data of the road user can be as described with respect to data of the current-pose column 808 of FIG. 8. As such, the respective predicted data and the actual data include respective longitudinal and latitudinal data. In an example, the respective predicted data and the actual data can include longitudinal and latitudinal data can further include respective at least one of heading data, velocity data, or speed data.

At 1110, the technique 1100 obtains an average prediction displacement error using at least one of the actual data and at least two corresponding respective predicted data. The average prediction displacement error can indicate a displacement that an actual trajectory of the road user exhibits compared to a prediction of the trajectory of the road user through time. As described with respect to FIG. 8, the at least two corresponding respective predicted data are predictions of the at least one of the actual data. At 1112, the technique 1100 determines a prediction accuracy based on the average prediction displacement error. The prediction accuracy can be determined as described with respect to FIGS. 10A-10B.

In an example, obtaining the average prediction displacement error using the at least one of the actual data and the at least two corresponding respective predicted data can include obtaining a first difference between the at least one the of actual data and a first of the at least two corresponding respective predicted data; obtaining a second difference between the at least one of the actual data and a second of the at least two corresponding respective predicted data; and obtaining the average prediction displacement error using the first difference and the second difference.

In an example, the technique 1100 can further include determining a driving behavior of the road user based on the prediction accuracy. In an example, the technique 1100 can further include autonomously preforming a driving maneuver responsive to determining that the road user is a non-safe driver. The driving maneuver can include a maneuver to avoid driving in a blind spot of the road user.

Figure 12:
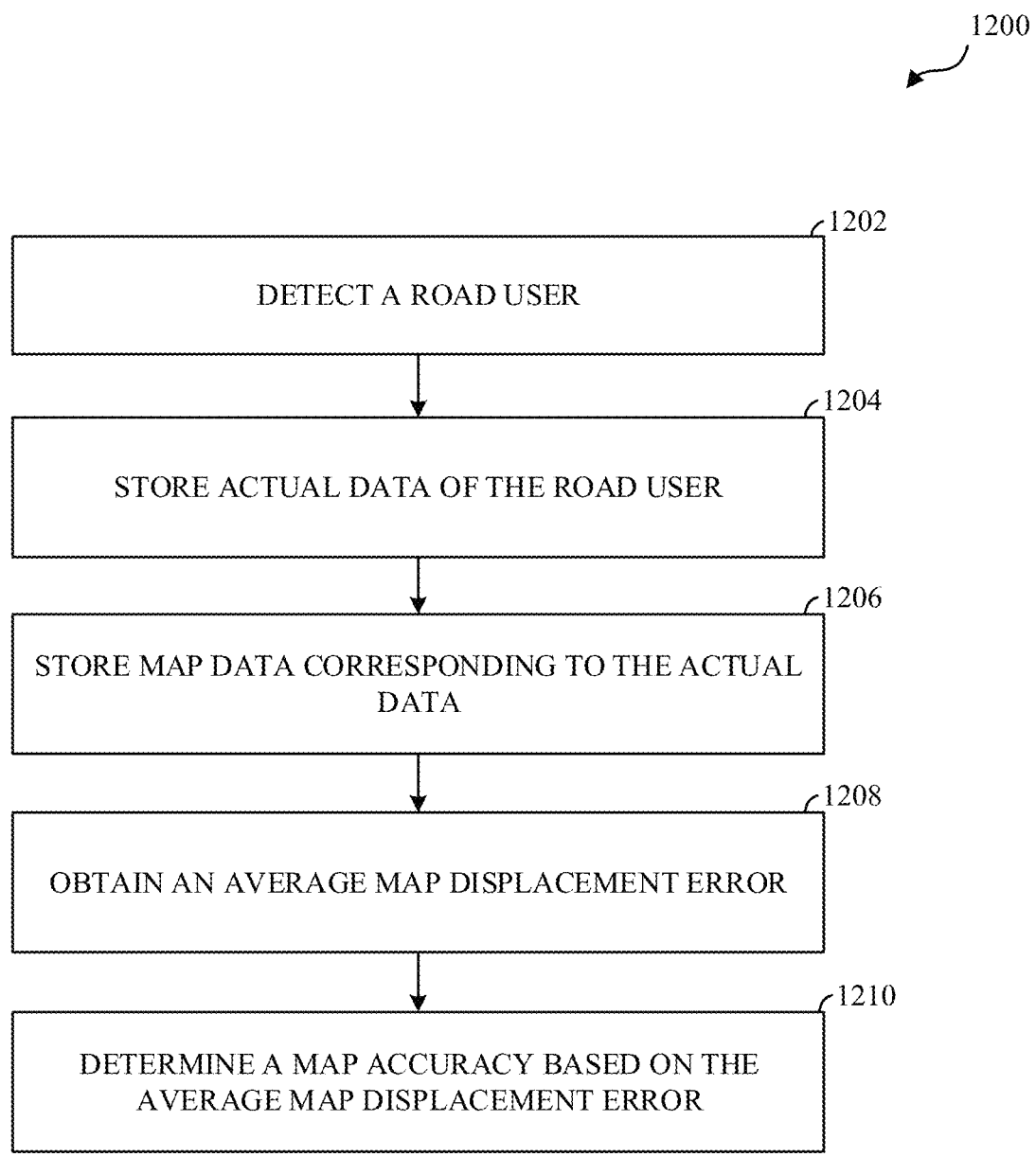
FIG. 12 is flowchart of a technique for determining map errors.

FIG. 12 is flowchart of a technique 1200 for determining map errors. The technique 1200 can be implemented in a vehicle (i.e., a host vehicle, an apparatus), such as the vehicle 100 of FIG. 1 or the vehicle 202 of FIG. 2. The technique 1200 can be implemented can be implemented by the system 700 of FIG. 7. The technique 1200 can be implemented, at least partially, by a trajectory planner, such as the trajectory planner 408 of FIG. 4 or the trajectory planner 500 of FIG. 5. The technique 1200 can be implemented, at least partially, by a world model module, such as the world model module 402 of FIG. 4. The technique 1200 can be implemented, for example, as one or more software programs that may be executed by a processor, such as the processor 120 of FIG. 1. The software program(s) can include machine-readable executable instructions that may be stored in a memory (e.g., a non-transitory computer-readable storage medium) such as the memory 122 of FIG. 1, and that, when executed by the processor, may cause the computing device to perform the technique 1200.

At 1202, the technique 1200 detects a road user. The road user can be detected using sensors of the host vehicle, as described with respect to FIG. 7. At 1204, the technique 1200 stores, in a data structure, actual data of the road user, as described with respect to FIG. 8. At 1206, the technique 1200 stores, in the data structure, map data corresponding to the actual data. The map data can be obtained from a high-definition map. The map data can be stored in the data structure as described with respect to map-pose column 806 of FIG. 8. In an example, the data structure can be a circular buffer. The map data can be data that correspond to the mapped driveline that is obtained from a high-definition map.

At 1208, the technique 1200 obtains an average map displacement error based on a comparison of at least some of the actual data and corresponding at least some map data. The average map displacement error can indicate differences between a mapped driveline of a lane and how the road user actually traverses the lane. At 1210, the technique 1200 determines a map accuracy based on the average map displacement error. In an example, determining the map accuracy based on the average map displacement error can include, responsive to detecting an object that is obstructing a trajectory of the road user, determining that the map accuracy is unknown, as described with respect to the scene 1040 of FIG. 10A.

In an example, the technique 1200 further includes modifying the driveline in the high-definition map based on the average map displacement error to obtain a modified driveline, as described above. In an example, the technique 1200 can further include planning a trajectory according to the modified driveline that is based on the average map displacement error, instead of planning a trajectory according the mapped driveline, as described above.

For simplicity of explanation, the techniques 1100 and 1200 are depicted and described as a series of operations. However, the operations in accordance with this disclosure can occur in various orders and/or concurrently. Additionally, other steps or operations not presented and described herein may be used. Furthermore, not all illustrated operations may be required to implement a technique in accordance with the disclosed subject matter.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
    detecting a road user;
    determining respective predicted data for the road user;
    storing, in a data structure, the respective predicted data;
    storing, in the data structure, actual data of the road user;
    storing, in the data structure, map data corresponding to the actual data, wherein the map data is obtained from a high-definition map;
    obtaining an average prediction displacement error using at least one of the actual data and at least two corresponding respective predicted data, wherein the average prediction displacement error is a numerical value indicating a distance displacement that an actual trajectory of the road user exhibits compared to a predicted trajectory of the road user through time, and wherein the at least two corresponding respective predicted data are predictions of the at least one of the actual data;
    categorizing prediction accuracy based on the average prediction displacement error;
    obtaining an average map displacement error based on a comparison of at least one of the actual data and at least two corresponding respective map data, wherein the average map displacement error indicates distance differences between a mapped driveline of a lane and how the road user actually traverses the lane;
    categorizing map accuracy based on the average map displacement error; and
    determining a scene understanding based on the categorized prediction accuracy and the categorized map accuracy.

2. The method of claim 1, wherein the respective predicted data and the actual data comprise respective longitudinal and latitudinal data.

3. The method of claim 2, wherein the respective longitudinal and latitudinal data comprises at least one of heading data, velocity data, or speed data.

4. The method of claim 1, wherein obtaining the average prediction displacement error using the at least one of the actual data and the at least two corresponding respective predicted data comprises:
    obtaining a first difference between the at least one of the of actual data and a first of the at least two corresponding respective predicted data;
    obtaining a second difference between the at least one of the actual data and a second of the at least two corresponding respective predicted data; and
    obtaining the average prediction displacement error using the first difference and the second difference.

5. The method of claim 1, further comprising:
    autonomously performing a driving maneuver responsive to determining that the road user is not driving according to predicted trajectories.

6. The method of claim 5, wherein the driving maneuver comprises at least one of a maneuver to avoid driving in a blind spot of the road user, a maneuver to maintain at least a predetermined driving distance between a host vehicle and the road user, or a maneuver to pass the road user.

7. The method of claim 1, wherein categorizing the map accuracy based on the average map displacement error comprises:
    responsive to detecting a static object at a pose on the mapped driveline of the lane, categorizing the map accuracy as unknown.

8. The method of claim 1, further comprising:
    categorizing a driving behavior of another road user based on the scene understanding.

9. The method of claim 1, further comprising:
    autonomously performing a driving maneuver responsive to determining that another road user is not following the mapped driveline and is not driving according to predicted trajectories.

10. The method of claim 1, further comprising:
    autonomously performing a safety maneuver responsive to the accuracy of the scene understanding being less than or equal to a preset level, wherein the safety maneuver comprises at least one of controlling a host vehicle to slow down, handing off control to a driver, handing off control to a teleoperator, or stopping the host vehicle.

11. The method of claim 8, wherein the driving behavior of the another road user is categorized as non-safe when the road user is not following the mapped driveline and is not driving according to predicted trajectories.

12. The method of claim 11, further comprising:
    autonomously performing a driving maneuver responsive to categorizing the driving behavior of the other road user as non-safe.

13. A method, comprising:
    detecting a road user;
    determining respective predicted data for the road user;
    storing, in a data structure, actual data of the road user;
    storing, in the data structure, map data corresponding to the actual data, wherein the map data is obtained from a high-definition map;

storing, the data structure, the respective predicted data;

obtaining an average prediction displacement error using at least one of the actual data and at least two corresponding respective predicted data, wherein the average prediction displacement error is a value indicating a distance displacement that an actual trajectory of the road user exhibits compared to a predicted trajectory of the road user through time, and wherein the at least two corresponding respective predicted data are predictions of the at least one of the actual data;

obtaining an average map displacement error based on a comparison of at least one of the actual data and at least two corresponding respective map data, wherein the average map displacement error indicates distance differences between a pose of a mapped driveline of a lane and poses of the road user as the road user moves forward or laterally in the lane, the pose of the mapped driveline corresponds to one or more data points in the map data that indicate a lateral position and a longitudinal position; and determining whether predicted trajectories of other road users can be relied upon based on the average prediction displacement error and the average map displacement error.

14. The method of claim 13, wherein the data structure is a circular buffer.

15. The method of claim 13, wherein the map data corresponds to the mapped driveline that is obtained from the high-definition map.

16. The method of claim 13, further comprising:
modifying the mapped driveline in the high-definition map based on the average map displacement error.

17. The method of claim 13, further comprising:
planning a trajectory according to a modified driveline that is based on the average map displacement error instead of the mapped driveline.

18. An apparatus, comprising:
a processor configured to:
detect a road user;
determine respective predicted data for the road user;
store, in a data structure, actual data of the road user;
store, in the data structure, the respective predicted data;
store, in the data structure, map data corresponding to the actual data, wherein the map data is obtained from a high-definition map;
obtain an average prediction displacement error that indicates a displacement that an actual trajectory of the road user exhibits compared to a predicted trajectory of the road user through time;
obtain an average map displacement error based on a comparison of at least one of the actual data and at least two corresponding respective map data, wherein the average map displacement error indicates distance differences between a mapped driveline of a lane and how the road user actually traverses the lane;
determine a scene understanding based on the average prediction displacement error and the average map displacement error; and
categorize a driving behavior of another road user based on the determined scene understanding, wherein the driving behavior of the other road user is categorized as non-safe when the other road user is not following the mapped driveline and is not driving according to predicted trajectories.

19. The apparatus of claim 18, wherein the map data corresponds to the mapped driveline that is obtained from the high-definition map.

20. The apparatus of claim 18, wherein the processor is further configured to:
modify the mapped driveline in the high-definition map based on the average map displacement error to obtain a modified driveline; and
plan a trajectory according to the modified driveline.

* * * * *